(12) United States Patent
Kosaka et al.

(10) Patent No.: US 7,582,692 B2
(45) Date of Patent: *Sep. 1, 2009

(54) FLAME RETARDANT THERMOPLASTIC COMPOSITION AND ARTICLES COMPRISING THE SAME

(75) Inventors: Kazunari Kosaka, Mibu-Machi (JP); Xiucuo Li, Shanghai (CN); Weiguang Yao, Moka (JP)

(73) Assignee: Sabic Innovative Plastics IP B.V. (NL)

( * ) Notice: Subject to any disclaimer, the term of this patent is extended or adjusted under 35 U.S.C. 154(b) by 449 days.

This patent is subject to a terminal disclaimer.

(21) Appl. No.: 11/291,467

(22) Filed: Nov. 30, 2005

(65) Prior Publication Data

US 2006/0106139 A1    May 18, 2006

Related U.S. Application Data

(63) Continuation-in-part of application No. 11/091,277, filed on Mar. 28, 2005, now Pat. No. 7,417,083, which is a continuation-in-part of application No. 10/881,818, filed on Jun. 29, 2004, now abandoned.

(60) Provisional application No. 60/651,470, filed on Apr. 1, 2004.

(51) Int. Cl.
C08K 5/523 (2006.01)
C08K 5/3492 (2006.01)

(52) U.S. Cl. .................. 524/127; 524/99; 524/100; 524/140; 524/141; 524/436; 524/437

(58) Field of Classification Search ........... 524/99, 524/100, 127, 140, 141, 436, 437
See application file for complete search history.

(56) References Cited

U.S. PATENT DOCUMENTS

| | | | |
|---|---|---|---|
| 2,276,101 A | 3/1942 | Schueler ................ 427/319 |
| 2,933,480 A | 4/1960 | Gresham et al. ........... 526/336 |
| 3,093,621 A | 6/1963 | Gladding ................ 526/282 |
| 3,211,709 A | 10/1965 | Adamek et al. ........... 526/283 |
| 3,646,168 A | 2/1972 | Barrett ................... 260/889 |
| 3,790,519 A | 2/1974 | Wahlborg ................ 260/285 |
| 3,884,993 A | 5/1975 | Gross .................... 525/211 |
| 3,894,999 A | 7/1975 | Boozer et al. ............ 526/282 |
| 4,059,654 A | 11/1977 | Meredith et al. ........... 524/525 |
| 4,145,377 A | 3/1979 | Bussink et al. |
| 4,166,055 A | 8/1979 | Lee ...................... 524/141 |
| 4,239,673 A | 12/1980 | Lee, Jr. |
| 4,242,263 A | 12/1980 | Lee, Jr. |
| 4,383,082 A | 5/1983 | Lee, Jr. |
| 4,396,586 A | 8/1983 | Maurer et al. |
| 4,578,429 A | 3/1986 | Gergen et al. ............ 525/291 |
| 4,584,334 A | 4/1986 | Lee et al. ................ 524/151 |
| 4,684,682 A | 8/1987 | Lee, Jr. |
| 4,760,118 A | 7/1988 | White et al. ............. 525/397 |
| 4,866,114 A | 9/1989 | Taubita et al. |
| 4,879,330 A | 11/1989 | DeMunck et al. |
| 4,882,384 A | 11/1989 | Willis et al. ............. 525/105 |
| 4,898,914 A | 2/1990 | Gergen et al. ............ 525/314 |
| 4,910,241 A | 3/1990 | Abolins et al. |
| 4,945,018 A | 7/1990 | Abolins et al. |
| 4,970,265 A | 11/1990 | Willis .................. 525/332.9 |
| 4,988,565 A | 1/1991 | DeMunck et al. |
| 5,166,264 A | 11/1992 | Lee, Jr. et al. |
| 5,206,276 A | 4/1993 | Lee ...................... 524/151 |
| 5,206,300 A | 4/1993 | Chamberlain ............ 525/314 |
| 5,258,455 A | 11/1993 | Dekkers et al. ............ 525/68 |
| 5,262,480 A | 11/1993 | Lee, Jr. |
| 5,276,101 A | 1/1994 | Chamberlain et al. ....... 525/314 |
| 5,278,212 A | 1/1994 | Nishihara et al. |
| 5,344,931 A | 9/1994 | Cipolli et al. |
| 5,364,898 A | 11/1994 | Lee, Jr. et al. |
| 5,397,822 A | 3/1995 | Lee ...................... 524/127 |
| 5,455,292 A * | 10/1995 | Kakegawa et al. .......... 524/141 |
| 5,506,299 A | 4/1996 | Gelles et al. .............. 525/66 |
| 5,516,831 A | 5/1996 | Gelles et al. ............. 524/474 |
| 5,594,054 A | 1/1997 | Lee, Jr. |
| 5,830,319 A | 11/1998 | Landin .................. 162/159 |

(Continued)

FOREIGN PATENT DOCUMENTS

EP         389768        10/1990

(Continued)

OTHER PUBLICATIONS

International Search Report for International Application No. PCT/US2005/011123, mailed Jul. 26, 2005.
Japanese Patent No. JP11189686 published Jul. 13, 1999, abstract only.
Japanese Patent No. JP11189690 published Jul. 13, 1999, abstract only.
Japanese Patent No. JP2003-328328 published Nov. 19, 203, abstract only.

(Continued)

*Primary Examiner*—Peter Szekely
(74) *Attorney, Agent, or Firm*—Cantor Colburn LLP

(57) ABSTRACT

A flame retardant thermoplastic composition comprises:
  a poly(arylene ether);
  an impact modifier;
  a polyolefin;
  a phosphoric acid salt selected from the group consisting of melamine phosphate, melamine pyrophosphate, melamine orthophosphate, diammonium phosphate, monoammonium phosphate, phosphoric acid amide, melamine polyphosphate, ammonium polyphosphate, polyphosphoric acid amide, and combinations of two or more of the foregoing;
  a metal hydroxide; and
  an organic phosphate wherein the amount of phosphoric acid salt by weight is greater than or equal to the amount of organic phosphate by weight. The flame retardant composition is may be used in the production of electrical wires.

26 Claims, 2 Drawing Sheets

U.S. PATENT DOCUMENTS

| | | |
|---|---|---|
| 5,900,446 A | 5/1999 | Nishihara et al. |
| 6,025,419 A | 2/2000 | Kasowski et al. |
| 6,045,883 A | 4/2000 | Akiyama et al. |
| 6,093,760 A * | 7/2000 | Nishihara et al. ............ 524/145 |
| 6,225,383 B1 | 5/2001 | Hirono et al. ................ 524/100 |
| 6,306,978 B1 | 10/2001 | Braat et al. .................. 525/397 |
| 6,312,810 B1 | 11/2001 | Nozaki et al. ............... 428/364 |
| 6,423,768 B1 | 7/2002 | Khouri |
| 6,433,046 B1 | 8/2002 | Campbell et al. |
| 6,528,558 B2 | 3/2003 | Lewin |
| 6,531,530 B2 | 3/2003 | Asano |
| 6,555,605 B1 * | 4/2003 | Casiraghi ..................... 524/126 |
| 6,608,123 B2 | 8/2003 | Galli et al. |
| 6,689,825 B1 | 2/2004 | Bajgur et al. ............... 524/100 |
| 6,790,887 B1 | 9/2004 | Nishihara |
| 7,115,677 B2 | 10/2006 | Harashina et al. |
| 7,205,346 B2 * | 4/2007 | Harashina ................... 524/133 |
| 2002/0137840 A1 | 9/2002 | Adedeji et al. |
| 2003/0022968 A1 | 1/2003 | Imanishi |
| 2003/0088000 A1 | 5/2003 | Kimura et al. .............. 524/115 |
| 2003/0138371 A1 | 7/2003 | Keramati et al. ............ 423/478 |
| 2003/0164483 A1 | 9/2003 | Scelza et al. ................ 252/601 |
| 2003/0166776 A1* | 9/2003 | Wright et al. ................. 525/88 |
| 2003/0176582 A1 | 9/2003 | Bening et al. ............... 525/542 |
| 2003/0181584 A1 | 9/2003 | Clawson et al. ............... 525/88 |
| 2003/0181585 A1 | 9/2003 | Handlin et al. |
| 2004/0039128 A1 | 2/2004 | Sasagawa et al. ........ 525/331.9 |
| 2004/0102551 A1 | 5/2004 | Sato et al. |
| 2004/0122139 A1 | 6/2004 | Yang et al. |
| 2004/0138371 A1 | 7/2004 | St. Clair et al. |
| 2004/0254270 A1 | 12/2004 | Harashina ..................... 524/86 |
| 2005/0137346 A1 | 6/2005 | Bening et al. |
| 2005/0137347 A1 | 6/2005 | Bening et al. |
| 2005/0137348 A1 | 6/2005 | Bening et al. |
| 2005/0137349 A1 | 6/2005 | Bening et al. |
| 2005/0137350 A1 | 6/2005 | Bening et al. |
| 2005/0154100 A1 | 7/2005 | Kosaka et al. |
| 2005/0171290 A1 | 8/2005 | Bening et al. |
| 2005/0285086 A1 | 12/2005 | Kosaka et al. ............... 252/609 |
| 2005/0288402 A1 | 12/2005 | Kosaka et al. ................ 524/90 |
| 2006/0106139 A1 | 5/2006 | Kosaka et al. |
| 2006/0182967 A1 | 8/2006 | Kosaka et al. |
| 2006/0208239 A1 | 9/2006 | Bauer et al. |
| 2007/0112132 A1 | 5/2007 | Zhao et al. |

FOREIGN PATENT DOCUMENTS

| | | |
|---|---|---|
| EP | 0467113 | 1/1992 |
| EP | 0362660 | 1/1995 |
| EP | 0611798 | 10/1998 |
| EP | 0639620 | 4/1999 |
| EP | 1424357 | 11/2006 |
| EP | 1852446 | 11/2007 |
| GB | 2043083 | 10/1979 |
| WO | WO 95/16736 | 6/1995 |
| WO | 03004560 | 1/2003 |
| WO | WO 03/046084 * | 6/2003 |
| WO | 2004072170 | 8/2004 |

OTHER PUBLICATIONS

UL 1581 "Reference Standards for Electrical Wires, Cables, and Flexible Cords" 236 pages.
UL 94 "Tests for Flammability of Plastic Materials for Parts in Devices and Appliances" pp. 1-52.
ASTM D2240-03 "Standard Test Method for Rubber Property-Durometer Hardness" 12 pages.
ASTM D790-03 "Standard Test method for Flexural Properties of Unreinforced and Reinforced Plastics and Electrical Insulating Materials" 11 pages.
ASTM D638-03 "Standard Test Method for Tensile Properties of Plastics" 15 pages.
International Search Report for International Application No. PCT/US2006/010462, mailed Aug. 18, 2006.
Japanese Patent Publication No. 11-189685, Published 199-07-13, Human Translation, 14 pages.
Japanese Patent Publication No. H9-30998755057, Published Dec. 2, 1997, Human Translation, 13 pages.
Japanese Application No. H9-87483, Published Jun. 31, 1997, Human Translation, 12 pages.
Japanese Publication No. H7-224193, Published Aug. 22, 1995, Machine Translation, 22 pages.
Japanese Patent Application No. 1-185532, Published Jul. 25, 1989, Machine Translation, 6 pages.
Japanese Patent No. 3418209, Published Jun. 16, 2003, Human Translation, 24 pages.
Japanese Patent Publication No. 2003-253066, Published Sep. 10, 2003, Machine Translation, 11 pages.
EP0926496, published Dec. 8, 1999, Human Translation, 22 pages.

* cited by examiner

FLAME RETARDANT THERMOPLASTIC COMPOSITION AND ARTICLES COMPRISING THE SAME

CROSS REFERENCE TO RELATED APPLICATIONS

This application is a continuation in part of U.S. patent application Ser. No. 11/091,277 filed on Mar. 28, 2005, now U.S. Pat. No. 7,417,083, which is a continuation in part of U.S. patent application Ser. No. 10/881,818 filed on Jun. 29, 2004, now abandoned, which claims priority to U.S. Provisional Patent Application Ser. No. 60/651,470, filed on Apr. 1, 2004, all of which are incorporated by reference herein.

BACKGROUND OF INVENTION

The disclosure relates to flame retardant additive compositions. In particular, the invention relates to flame retardant additive compositions useful in a variety of thermoplastics.

A wide variety of applications require flame retardant thermoplastic compositions. In addition to being flame retardant, the thermoplastic compositions must often meet a range of criteria ranging from physical performance to appearance to environmental impact. In recent years there has been an increasing trend to employ phosphates as the flame retardant in order to meet many or all of these criteria. While the use of phosphates has been successful in many instances, highly flammable compositions have continued to be problematic. Highly flammable thermoplastic compositions frequently require high levels of phosphate flame retardants to obtain the desired level of flame retardancy but high levels of phosphate flame retardants can result in objectionable physical properties such as plate-out and migration. Plate out and migration refer to the movement of solid and liquid component to the surface of the article as evidenced in some cases by a powdery or tacky feel to the surface. Other flame retardants such as magnesium hydroxide and aluminum trihydrate are known but at high levels frequently have a negative impact on physical properties.

Accordingly there remains a need in the art for a flame retardant composition that provides excellent flame retardance to thermoplastic compositions and has little or no negative impact on the physical properties of the thermoplastic composition.

BRIEF DESCRIPTION OF THE INVENTION

The above described needs are addressed by a flame retardant thermoplastic composition comprises:
  a poly(arylene ether);
  an impact modifier;
  a polyolefin;
  a phosphoric acid salt selected from the group consisting of melamine phosphate, melamine pyrophosphate, melamine orthophosphate, diammonium phosphate, monoammonium phosphate, phosphoric acid amide, melamine polyphosphate, ammonium polyphosphate, polyphosphoric acid amide, and combinations of two or more of the foregoing;
  a metal hydroxide; and
  an organic phosphate wherein the amount of phosphoric acid salt by weight is greater than or equal to the amount of organic phosphate by weight.

In another embodiment, a flame retardant thermoplastic composition comprises:
  a poly(arylene ether);
  an impact modifier;
  a polyolefin;
  7 to 20 weight percent of a phosphoric acid salt selected from the group consisting of melamine phosphate, melamine pyrophosphate, melamine orthophosphate, diammonium phosphate, monoammonium phosphate, phosphoric acid amide, melamine polyphosphate, ammonium polyphosphate, polyphosphoric acid amide, and combinations of two or more of the foregoing;
  4 to 15 weight percent of a metal hydroxide; and
  3 to 11 weight percent of an organic phosphate wherein weight percent is with respect to the combined weight of the poly(arylene ether), impact modifier, polyolefin, phosphoric acid salt, metal hydroxide and organic phosphate.

In another embodiment, electrical wire comprises:
a conductor, and
a covering disposed over the conductor wherein the covering comprises:
a flame retardant thermoplastic composition comprises:
a poly(arylene ether);
an impact modifier;
a polyolefin;
a phosphoric acid salt selected from the group consisting of melamine phosphate, melamine pyrophosphate, melamine orthophosphate, diammonium phosphate, monoammonium phosphate, phosphoric acid amide, melamine polyphosphate, ammonium polyphosphate, polyphosphoric acid amide, and combinations of two or more of the foregoing;
a metal hydroxide; and
an organic phosphate wherein the amount of phosphoric acid salt by weight is greater than or equal to the amount of organic phosphate by weight.

In another embodiment, electrical wire comprises:
a conductor, and
a covering disposed over the conductor wherein the covering comprises:
a flame retardant thermoplastic composition comprises:
a poly(arylene ether);
an impact modifier;
a polyolefin;
7 to 20 weight percent of a phosphoric acid salt selected from the group consisting of melamine phosphate, melamine pyrophosphate, melamine orthophosphate, diammonium phosphate, monoammonium phosphate, phosphoric acid amide, melamine polyphosphate, ammonium polyphosphate, polyphosphoric acid amide, and combinations of two or more of the foregoing;
4 to 15 weight percent of a metal hydroxide; and
3 to 11 weight percent of an organic phosphate wherein weight percent is with respect to the combined weight of the poly(arylene ether), impact modifier, polyolefin, phosphoric acid salt, metal hydroxide and organic phosphate.

DETAILED DESCRIPTION

Figure 1:
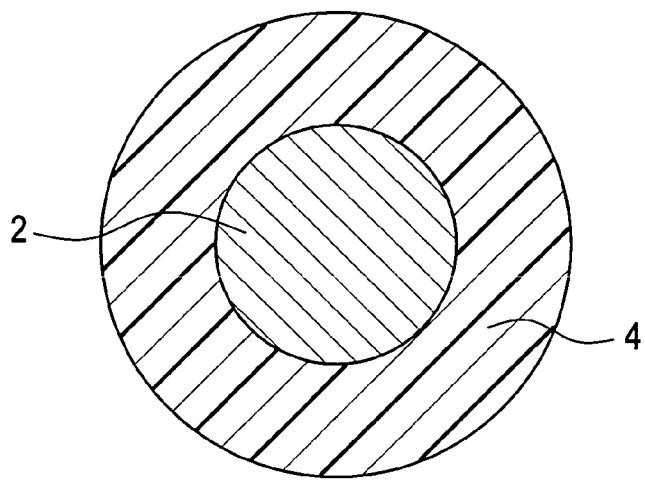
FIG. 1 is a schematic representation of a cross-section of electrical wire.

The flame retardant additive composition comprises a phosphoric acid salt selected from the group consisting of melamine phosphate, melamine pyrophosphate, melamine orthophosphate, ammonium phosphate, phosphoric acid amide, melamine polyphosphate, ammonium polyphosphate, polyphosphoric acid amide and combinations of two or more of the foregoing; a metal hydroxide; and an organic phosphate. The flame retardant additive composition has the advantage of providing excellent flame retardance at lower levels of organic phosphate than organic phosphate alone, thus decreasing or eliminating plate-out and migration in thermoplastic compositions. The flame retardant additive composition can be used with a wide range of thermoplastics and combinations of thermoplastics to decrease the flammability of the thermoplastic and to yield flame retardant thermoplastic compositions.

In one embodiment the flame retardant additive composition consists essentially of a phosphoric acid salt selected from the group consisting of melamine phosphate, melamine pyrophosphate, melamine orthophosphate, ammonium phosphate, phosphoric acid amide, melamine polyphosphate, ammonium polyphosphate, polyphosphoric acid amide and combinations of two or more of the foregoing; a metal hydroxide; and an organic phosphate. "Consisting essentially of" as used herein allows the inclusion of additional components as long as those additional components do not materially affect the basic and novel characteristics of the flame retardant additive, such as the ability to provide the same or greater level of flame retardance to a thermoplastic composition at lower levels of organic phosphate than organic phosphate alone and/or being essentially free (containing less than 0.05 weight percent, or, more specifically less than 0.005 weight percent, based on the combined weight of phosphoric acid salt, metal hydroxide and organic phosphate) of chlorine and bromine.

In another embodiment the flame retardant additive composition consists of a phosphoric acid salt selected from the group consisting of melamine phosphate, melamine pyrophosphate, melamine orthophosphate, monoammonium phosphate, diammonium phosphate, phosphoric acid amide, melamine polyphosphate, ammonium polyphosphate, polyphosphoric acid amide, and combinations of two or more of the foregoing; a metal hydroxide; and an organic phosphate.

As mentioned above, the phosphoric acid salt can be selected from the group consisting of melamine phosphate (for example, CAS No. 20208-95-1), melamine pyrophosphate (for example, CAS No. 15541-60-3), melamine orthophosphate (for example, CAS No. 20208-95-1), monoammonium phosphate (for example, CAS No. 7722-76-1), diammonium phosphate (for example, CAS No. 7783-28-0), phosphoric acid amide (for example, CAS No. 680-31-9), melamine polyphosphate (for example, CAS No. 218768-84-4 or 56386-64-2), ammonium polyphosphate (for example, CAS No. 68333-79-9), polyphosphoric acid amide and combinations of two or more of the foregoing phosphoric acid salts. The phosphoric acid salt can be surface coated with one or more of compounds selected from melamine monomer, melamine resin, modified melamine resin, guanamine resin, epoxy resin, phenol resin, urethane resin, urea resin, silicone resin, and the like. The identity of the surface coating, when present, is typically chosen based upon the identity of the thermoplastic components of the fire retardant thermoplastic composition. In one embodiment the phosphoric acid salt comprises melamine polyphosphate.

Phosphoric acid salts are commercially available or can be synthesized by the reaction of a phosphoric acid with the corresponding amine containing compound as is taught in the art.

The phosphoric acid salt can be present in the flame retardant additive composition in an amount of 10 to 40 weight percent, based on the combined weight of phosphoric acid salt, metal hydroxide and organic phosphate. Within this range the phosphoric acid salt can be present in an amount greater than or equal to 12, or, more specifically, greater than or equal to 14, or, even more specifically, greater than or equal to 16 weight percent based on the combined weight of phosphoric acid salt, metal hydroxide and organic phosphate. Also within this range the phosphoric acid salt can be present in an amount less than or equal to 35, or, more specifically, less than or equal to 30, or, even more specifically, less than or equal to 28 weight percent based on the combined weight of phosphoric acid salt, metal hydroxide and organic phosphate.

In one embodiment, the phosphoric acid salt can be present in the flame retardant additive composition in an amount of 30 to 60 weight percent, based on the combined weight of phosphoric acid salt, metal hydroxide and organic phosphate. Within this range the phosphoric acid salt can be present in an amount greater than or equal to 32, or, more specifically, greater than or equal to 34, or, even more specifically, greater than or equal to 36 weight percent based on the combined weight of phosphoric acid salt, metal hydroxide and organic phosphate. Also within this range the phosphoric acid salt can be present in an amount less than or equal to 57, or, more specifically, less than or equal to 55 weight percent based on the combined weight of phosphoric acid salt, metal hydroxide and organic phosphate.

Suitable metal hydroxides include all those capable of providing fire retardance, as well as combinations thereof. The metal hydroxide can be chosen to have substantially no decomposition during processing of the fire additive composition and/or flame retardant thermoplastic composition. Substantially no decomposition is defined herein as amounts of decomposition that do not prevent the fire retardant additive composition from providing the desired level of fire retardance. Exemplary metal hydroxides include, but are not limited to, magnesium hydroxide (for example, CAS No. 1309-42-8), aluminum hydroxide (for example, CAS No. 21645-51-2), cobalt hydroxide (for example, CAS No. 21041-93-0) and combinations of two or more of the foregoing. In one embodiment, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, i.e. a weight loss of less than 1 weight percent upon drying at 120° C. for 1 hour. In some embodiments the metal hydroxide can be coated, for example, with stearic acid or other fatty acid.

The metal hydroxide can be present in the flame retardant additive composition in an amount of 10 to 45 weight percent, based on the combined weight of phosphoric acid salt, metal hydroxide and organic phosphate. Within this range the metal hydroxide can be present in an amount greater than or equal to 12, or, more specifically, greater than or equal to 14, or, even more specifically, greater than or equal to 16 weight percent based on the combined weight of phosphoric acid salt, metal hydroxide and organic phosphate. Also within this range the metal hydroxide can be present in an amount less than or equal to 40, or, more specifically, less than or equal to 37, or, even more specifically, less than or equal to 35 weight percent based on the combined weight of phosphoric acid salt, metal hydroxide and organic phosphate.

In one embodiment the weight ratio of metal hydroxide to phosphoric acid salt is greater than or equal to 0.8, or, more specifically, greater than or equal to 1.0.

In another embodiment, the weight ratio of metal hydroxide to phosphoric acid salt is 0.3 to 0.8.

The organic phosphate can be an aromatic phosphate compound of the formula (IX):

(IX)

where each R is independently an alkyl, cycloalkyl, aryl, alkyl substituted aryl, halogen substituted aryl, aryl substituted alkyl, halogen, or a combination of any of the foregoing, provided at least one R is aryl or alkyl substituted aryl.

Examples include phenyl bisdodecyl phosphate, phenylbisneopentyl phosphate, phenyl-bis (3,5,5'-tri-methyl-hexyl phosphate), ethyldiphenyl phosphate, 2-ethyl-exyldi(p-tolyl) phosphate, bis-(2-ethylhexyl) p-tolylphosphate, tritolyl phosphate, bis-(2-ethylhexyl) phenyl phosphate, tri-(nonylphenyl) phosphate, di(dodecyl) p-tolyl phosphate, tricresyl phosphate, triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, and the like. In one embodiment the phosphate is one in which each R is aryl and/or alkyl substituted aryl, such as triphenyl phosphate and tris(alkyl phenyl) phosphate.

Alternatively, the organic phosphate can be a di- or polyfunctional compound or polymer having the formula (X), (XI), or (XII) below:

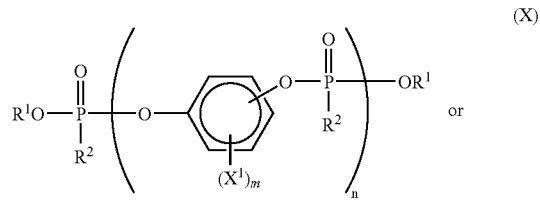

(X)

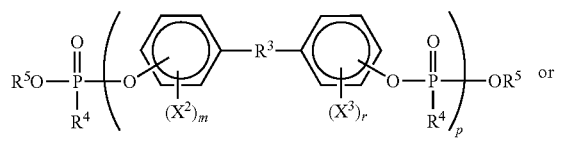

(XI)

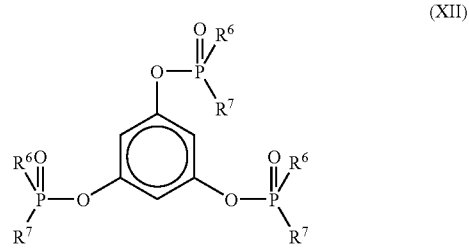

(XII)

including mixtures thereof, in which $R^1$, $R^3$ and $R^5$ are, independently, hydrocarbon; $R^2$, $R^4$, $R^6$ and $R^7$ are, independently, hydrocarbon or hydrocarbonoxy; $X^1$, $X^2$ and $X^3$ are, independently, halogen; m and r are 0 or integers from 1 to 4, and n and p are from 1 to 30.

Examples include the bis diphenyl phosphates of resorcinol, hydroquinone and bisphenol-A, respectively, or their polymeric counterparts.

Methods for the preparation of the aforementioned di- and polyfunctional aromatic phosphates are described in British Patent No. 2,043,083.

Exemplary organic phosphates include, but are not limited to, phosphates containing substituted phenyl groups, phosphates based upon resorcinol such as, for example, resorcinol bis-diphenylphosphate, as well as those based upon bis-phenols such as, for example, bis-phenol A bis-diphenylphosphate. In one embodiment, the organic phosphate is selected from tris(butyl phenyl) phosphate (for example, CAS No. 89492-23-9, and 78-33-1), resorcinol bis-diphenylphosphate (for example, CAS No. 57583-54-7), bis-phenol A bis-diphenylphosphate (for example, CAS No. 181028-79-5), triphenyl phosphate (for example, CAS No. 115-86-6), tris(isopropyl phenyl) phosphate (for example, CAS No. CAS No. 68937-41-7) and mixtures of two or more of the foregoing.

The organic phosphate can be present in the flame retardant additive composition in an amount of 15 to 80 weight percent, based on the total weight of the flame retardant additive composition. Within this range the organic phosphate can be present in an amount greater than or equal to 25, or, more specifically, greater than or equal to 30, or more specifically, greater than or equal to 35 based on the total weight of the flame retardant additive composition. Also within this range the organic phosphate can be present in an amount less than or equal to 75, more specifically, less than or equal to 70, or, even more specifically, less than or equal to 65 based on the total weight of the flame retardant additive composition.

In one embodiment, the organic phosphate can be present in the flame retardant additive composition in an amount of 9 to 45 weight percent, based on the total weight of the flame retardant additive composition. Within this range the organic phosphate can be present in an amount greater than or equal to 10 weight percent based on the total weight of the flame retardant additive composition. Also within this range the organic phosphate can be present in an amount less than or equal to 43, or, more specifically, less than or equal to 41 weight percent based on the total weight of the flame retardant additive composition.

In one embodiment when the weight ratio of metal hydroxide to phosphoric acid salt is greater than 0.8 the fire retardant additive composition can comprise 5 to 30 mole percent (mol %) phosphorous, 23 to 79 mol % nitrogen, and 7 to 68 mol % metal hydroxide, based on the total moles of phosphorous, nitrogen and metal hydroxide.

Within the preceding range the phosphorous can be present in an amount greater than or equal to 6 mol %, or, more specifically, in an amount greater than or equal to 10 mol %. Also within the preceding range the phosphorous can be present in an amount less than or equal to 28 mol %, or, more specifically in an amount less than or equal to 24 mol %.

Within the preceding range the nitrogen can be present in an amount greater than or equal to 30 mol %, or, more specifically, in an amount greater than or equal to 40 mol %. Also within the preceding range the nitrogen containing can be present in an amount less than or equal to 70 mol %, or, more specifically in an amount less than or equal to 60 mol %.

Within the preceding range the metal hydroxide can be present in an amount greater than or equal to 15 mol %, or, more specifically, in an amount greater than or equal to 20 mol %. Also within the preceding range the metal hydroxide can be present in an amount less than or equal to 55 mol %, or, more specifically in an amount less than or equal to 45 mol %.

The components of the flame retardant additive composition can be mixed together to form an additive composition. Alternatively, as discussed in detail below, the components can be blended with a thermoplastic to form a masterbatch or added individually, simultaneously, sequentially or a combination thereof, to the thermoplastic composition during or after its formation.

The flame retardant thermoplastic composition comprises a thermoplastic resin in addition to the flame retardant additive composition. The thermoplastic resin can be selected from the group consisting of poly(arylene ether); poly (arylene ether) blends; styrenic polymers and copolymers and their blends; polyolefin; polyolefin blends; polyethers and their blends; and polyamides and their blends. Exemplary poly(arylene ether) blends include compatibilized poly (arylene ether)/polyamide blends; poly(arylene ether)/polyolefin blends such as poly(arylene ether)/olefinic thermoplastics vulcanizates, poly(arylene ether)/ethylene-propylene rubber, and poly(arylene/ether)/EPDM; poly(arylene ether)/styrenic polymer or copolymer blends; impact modified poly (arylene ether) blends; and poly(arylene ether)/thermoplastic polyurethane blends. A flame retardant thermoplastic composition is herein defined as a thermoplastic composition having, according to the procedure of Underwriter's Laboratory Bulletin 94 entitled "Tests for Flammability of Plastic Materials, UL94" (UL94) at a thickness of 3.2 millimeters, a V2 rating or better. In one embodiment the flame retardant thermoplastic composition has a V1 rating or better. In another embodiment the flame retardant thermoplastic composition has a V0 rating.

In one embodiment the thermoplastic resin comprises poly (arylene ether) and an impact modifier. The thermoplastic resin may additionally comprise a polyolefin. In this embodiment the phosphoric acid salt may also be melem polyphosphate or melam polyphosphate.

In one embodiment, the flame retardant thermoplastic composition has a Durometer hardness (Shore A), as determined by ASTM D 2240 measured on a specimen having a 3 millimeter thickness, greater than or equal to 60. The Shore A hardness can be greater than or equal to 65 or greater than or equal to 70. The composition may have a Shore D hardness, as determined by ASTM D 2240 measured on a specimen having a 3 millimeter thickness, of 20 to 60. Within this range the Shore D hardness can be greater than or equal to 23 or greater than or equal to 26. Also within this range the Shore D hardness can be less than or equal to 55 or less then or equal to 50.

In some embodiments flame retardant thermoplastic composition has a flexural modulus, as determined by ASTM D790 using bars with a thickness of 6.4 millimeters (mm), of less than or equal to 1172 megapascals (MPa). The flexural modulus can be less than or equal to 517 MPa or less than or equal to 482 MPa. A flame retardant thermoplastic composition with the above described Shore A and flexural modulus finds use in a variety of applications requiring a flexible material, particularly wire coating and film, tubes, ducts, electrical insulator, insulation barrier, insulation breaker plate, wall paper, pipe and other applications where the combination of flame retardance, softness and flexibility are required.

In one embodiment an electrical wire comprises a covering disposed over a conductor. The covering comprises the fire retardant thermoplastic composition. The electrical wire may additionally comprise an adhesion promoting layer disposed between the electrically conductive wire and the thermoplastic composition.

In one embodiment the flame retardant thermoplastic composition is applied to the conductor by a suitable method such as extrusion coating to form an electrical wire. For example, a coating extruder equipped with a screw, crosshead, breaker plate, distributor, nipple, and die can be used. The melted thermoplastic composition forms a covering disposed over a circumference of the conductor. Extrusion coating may employ a single taper die, a double taper die, other appropriate die or combination of dies to position the conductor centrally and avoid die lip build up.

In one embodiment the covering has a thickness of 0.1 mm to 1.0 mm.

In some embodiments it may be useful to dry the flame retardant thermoplastic composition before extrusion coating the wire. Exemplary drying conditions are 60-90° C. for 2-20 hours. In one embodiment, drying conditions are 70-85° C. for 3-8 hours. Additionally, the flame retardant thermoplastic composition may be filtered prior to applying it to the conductive wire, typically through a filter having a mesh size of 30-300. In one embodiment the diameters of the openings in the filter are 175 micrometers to 74 micrometers. A color concentrate or masterbatch may be added to the flame retardant thermoplastic composition prior to extrusion coating. When a color concentrate is used it is typically present in an amount less than or equal to 5 weight percent, based on the total weight of the flame retardant thermoplastic composition. As appreciated by one of skill in the art, the color of the flame retardant thermoplastic composition prior to the addition of color concentrate may impact the final color achieved and in some cases it may be advantageous to employ a bleaching agent and/or color stabilization agents. Bleaching agents and color stabilization agents are known in the art and are commercially available.

The processing temperature during extrusion coating is generally less than or equal to 320° C., or, more specifically, less than or equal to 300° C., or, more specifically, less than or equal to 280° C. The processing temperature is greater than or equal to 200° C. Additionally the processing temperature is greater than or equal to the softening temperature of the poly(arylene ether).

In one embodiment the processing temperature during extrusion coating is generally less than or equal to 290° C., or, more specifically, less than or equal to 280° C., or, more specifically, less than or equal to 270° C. The processing temperature is greater than or equal to 200° C. Additionally the processing temperature is greater than or equal to the softening temperature of the poly(arylene ether).

After extrusion coating the coated wire may be cooled using a water bath, water spray, air jets or a combination comprising one or more of the foregoing cooling methods. Exemplary water bath temperatures are 5 to 80° C., or, in some embodiments 5 to 60° C. After cooling the coated wire is wound onto a spool or like device, typically at a speed of 50 meters per minute (m/min) to 500 m/min, or, more specifically 50 m/min to 300 m/min.

In one embodiment the composition is applied to a conductor having one or more intervening layers between the conductor and the covering to form a covering disposed over the conductor. For instance, an optional adhesion promoting layer may be disposed between the conductor and covering. In another example the conductor may be coated with a metal deactivator prior to applying the covering. In another example the intervening layer comprises a thermoplastic or thermoset composition that, in some cases, is foamed.

The conductor may comprise a single strand or a plurality of strands. In some cases, a plurality of strands may be bundled, twisted, braided, or a combination of the foregoing to form a conductor. Additionally, the conductor may have various shapes such as round or oblong. Suitable conductors include, but are not limited to, copper wire, aluminum wire, lead wire, and wires of alloys comprising one or more of the foregoing metals. The conductor may also be coated with, e.g., tin or silver.

Figure 2:
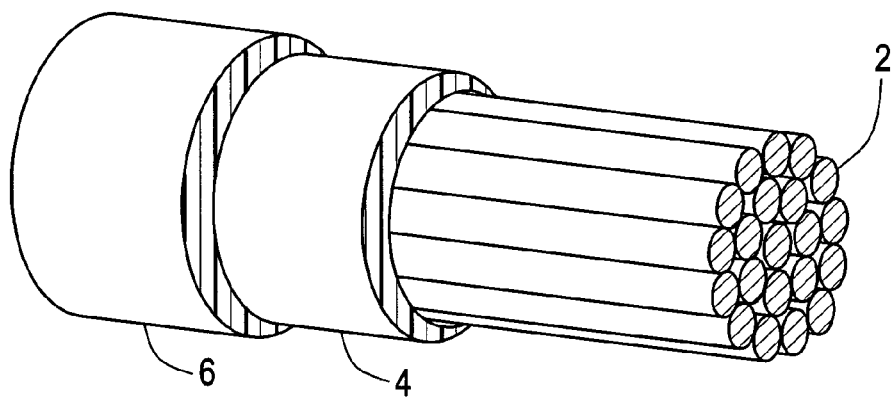
FIGS. 2 and 3 are perspective views of an electrical wire having multiple layers.
Figure 3:
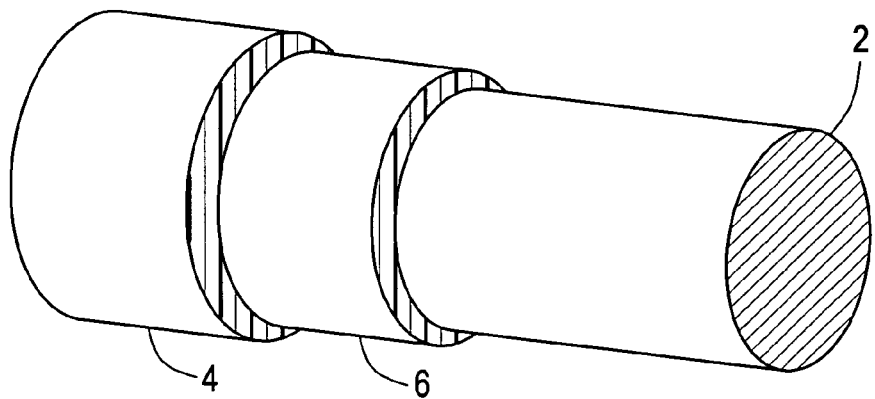
Figure 4:
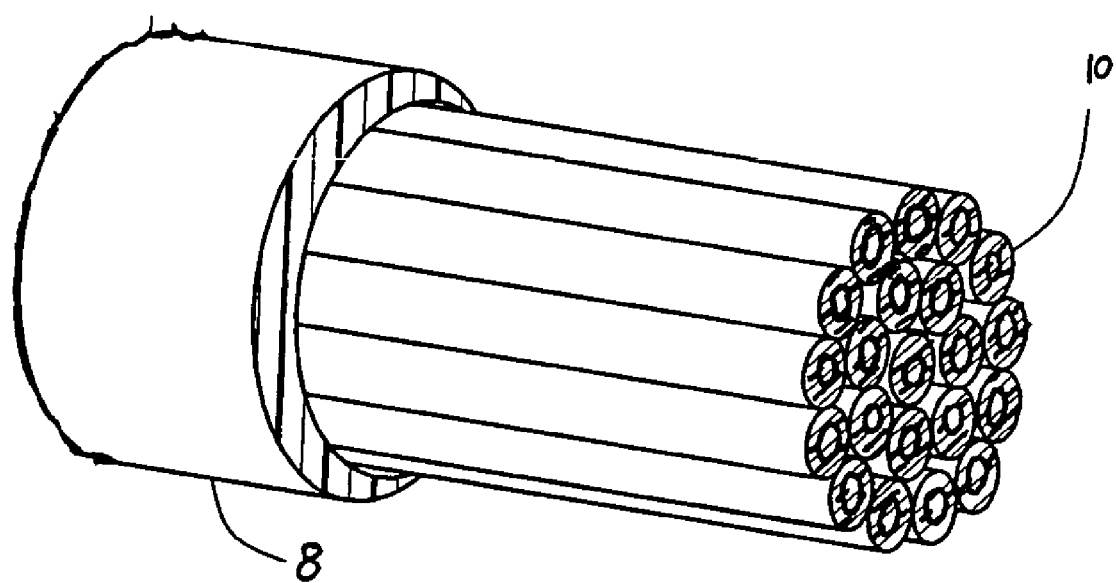
FIG. 4 is a perspective view of a jacketed wire.

A cross-section of an exemplary electrical wire is seen in FIG. 1. FIG. 1 shows a covering, 4, disposed over a conductor, 2. In one embodiment, the covering, 4, comprises a foamed thermoplastic composition. Perspective views of exemplary electrical wires are shown in FIGS. 2 and 3. FIG. 2 shows a covering, 4, disposed over a conductor, 2, comprising a plurality of strands and an optional additional layer, 6, disposed over the covering, 4, and the conductor, 2. In one embodiment, the covering, 4, comprises a foamed thermoplastic composition. Conductor, 2, can also comprise a unitary conductor. FIG. 3 shows a covering, 4, disposed over a unitary conductor, 2, and an intervening layer, 6. In one embodiment, the intervening layer, 6, comprises a foamed composition. Conductor, 2, can also comprise a plurality of strands. In addition, the covering described herein may be used to form a jacket surrounding two or more electrical wires wherein the electrical wires comprise a covering disposed over a conductor. FIG. 4 shows a jacket, 8, disposed over a plurality of covered conductors (electrical wires), 10.

In one embodiment the coating of the coated wire has tensile strength greater than or equal to 10 MegaPascals (Mpa) and ultimate elongation greater than or equal to 100% as determined by UL1581. The coated wire can also have flame resistance of VW-1.

The coated wire is useful for low voltage applications such as direct current electrical cords, USB cable, audio/visual cable and the like.

In some embodiments the flame retardant thermoplastic composition may have a tensile strength greater than or equal to 7.0 megapascals and a tensile elongation greater than or equal to 100%, or, more specifically, greater than or equal to 110%, or, even more specifically, greater than or equal to 120%. Tensile strength and elongation are both determined by ASTM D638 on Type I specimens having a thickness of 3.2 millimeters.

In some embodiments the flame retardant thermoplastic composition may have a tensile strength greater than or equal to 7.0 megapascals and a tensile elongation greater than or equal to 40%, or, more specifically, greater than or equal to 45%, or, even more specifically, greater than or equal to 50%. Tensile strength and elongation are both determined by ASTM D638 on Type I specimens having a thickness of 3.2 millimeters.

As used herein, a "poly(arylene ether)" comprises a plurality of structural units of the formula (I):

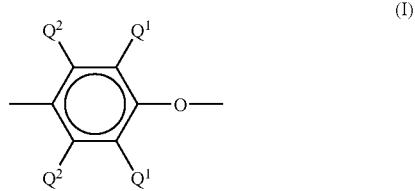

wherein for each structural unit, each $Q^1$ and $Q^2$ is independently hydrogen, primary or secondary lower alkyl (e.g., an alkyl containing 1 to 7 carbon atoms), phenyl, haloalkyl, aminoalkyl, alkenylalkyl, alkynylalkyl, hydrocarbonoxy, and aryl. In some embodiments, each $Q^1$ is independently alkyl or phenyl, for example, $C_{1-4}$ alkyl, and each $Q^2$ is independently hydrogen or methyl. The poly(arylene ether) may comprise molecules having aminoalkyl-containing end group(s), typically located in an ortho position to the hydroxy group. Also frequently present are tetramethyl diphenylquinone (TMDQ) end groups, typically obtained from reaction mixtures in which tetramethyl diphenylquinone by-product is present.

The poly(arylene ether) can be in the form of a homopolymer; a copolymer; a graft copolymer; an ionomer; or a block copolymer; as well as combinations comprising at least one of the foregoing. Poly(arylene ether) includes polyphenylene ether comprising 2,6-dimethyl-1,4-phenylene ether units optionally in combination with 2,3,6-trimethyl-1,4-phenylene ether units.

The poly(arylene ether) can be prepared by the oxidative coupling of monohydroxyaromatic compound(s) such as 2,6-xylenol and/or 2,3,6-trimethylphenol. Catalyst systems are generally employed for such coupling; they can contain heavy metal compound(s) such as a copper, manganese or cobalt compound, usually in combination with various other materials such as a secondary amine, tertiary amine, halide or combination of two or more of the foregoing.

In one embodiment, the poly(arylene ether) comprises a capped poly(arylene ether). The terminal hydroxy groups can be inactivated by capping with an inactivating capping agent via an acylation reaction, for example. The capping agent chosen is desirably one that results in a less reactive poly(arylene ether) thereby reducing or preventing crosslinking of the polymer chains and the formation of gels or black specks during processing at elevated temperatures. Suitable capping agents include, for example, esters of salicylic acid, anthranilic acid, or a substituted derivative thereof, and the like; esters of salicylic acid, and especially salicylic carbonate and linear polysalicylates, are preferred. As used herein, the term "ester of salicylic acid" includes compounds in which the carboxy group, the hydroxy group, or both have been esterified. Suitable salicylates include, for example, aryl salicylates such as phenyl salicylate, acetylsalicylic acid, salicylic carbonate, and polysalicylates, including both linear polysalicylates and cyclic compounds such as disalicylide and trisalicylide. The preferred capping agents are salicylic carbonate and the polysalicylates, especially linear polysalicylates. When capped, the poly(arylene ether) can be capped to any desirable extent up to 80 percent, more specifically up to 90 percent, and even more specifically up to 100 percent of the hydroxy groups are capped. Suitable capped poly(arylene ether) and their preparation are described in U.S. Pat. No. 4,760,118 to White et al. and U.S. Pat. No. 6,306,978 to Braat et al.

Capping poly(arylene ether) with polysalicylate is also believed to reduce the amount of aminoalkyl terminated groups present in the poly(arylene ether) chain. The aminoalkyl groups are the result of oxidative coupling reactions that employ amines in the process to produce the poly(arylene ether). The aminoalkyl group, ortho to the terminal hydroxy group of the poly(arylene ether), can be susceptible to decomposition at high temperatures. The decomposition is believed to result in the regeneration of primary or secondary amine and the production of a quinone methide end group, which may in turn generate a 2,6-dialkyl-1-hydroxyphenyl end group. Capping of poly(arylene ether) containing aminoalkyl groups with polysalicylate is believed to remove such amino groups to result in a capped terminal hydroxy group of the polymer chain and the formation of 2-hydroxy-N,N-alkyl-benzamine(salicylamide). The removal of the amino group and the capping provides a poly(arylene ether) that is more stable to high temperatures, thereby resulting in fewer degradative products, such as gels or black specks, during processing of the poly(controlled distribution arylene ether).

The poly(arylene ether) can be functionalized with a polyfunctional compound such as a polycarboxylic acid or those compounds having in the molecule both (a) a carbon-carbon double bond or a carbon-carbon triple bond and b) at least one carboxylic acid, anhydride, amide, ester, imide, amino, epoxy, orthoester, or hydroxy group. Examples of such polyfunctional compounds include maleic acid, maleic anhydride, fumaric acid, and citric acid.

The poly(arylene ether) can have a number average molecular weight of 3,000 to 40,000 grams per mole (g/mol) and a weight average molecular weight of 5,000 to 80,000 g/mol, as determined by gel permeation chromatography using monodisperse polystyrene standards, a styrene divinyl benzene gel at 40° C. and samples having a concentration of 1 milliliter per milliliter of chloroform. The poly(arylene ether) or combination of poly(arylene ether)s has an initial intrinsic viscosity greater than or equal to 0.35 dl/g, as measured in chloroform at 25° C. Initial intrinsic viscosity is defined as the intrinsic viscosity of the poly(arylene ether) prior to melt mixing with the other components of the composition. As understood by one of ordinary skill in the art the viscosity of the poly(arylene ether) may be up to 30% higher after melt mixing. The percentage of increase can be calculated by (final intrinsic viscosity after melt mixing—initial intrinsic viscosity before melt mixing)/initial intrinsic viscosity before melt mixing. Determining an exact ratio, when two initial intrinsic viscosities are used, will depend somewhat on the exact intrinsic viscosities of the poly(arylene ether) used and the ultimate physical properties that are desired.

The poly(arylene ether) may have a hydroxy end group content of less than or equal to 6300 parts per million based on the total weight of the poly(arylene ether) (ppm) as determined by Fourier Transform Infrared Spectrometry (FTIR). In one embodiment the poly(arylene ether) may have a hydroxy end group content of less than or equal to 3000 ppm, or, more specifically, less than or equal to 1500 ppm, or, even more specifically, less than or equal to 500 ppm.

The poly(arylene ether) can be substantially free of visible particulate impurities. In one embodiment, the poly(arylene ether) is substantially free of particulate impurities greater than 15 micrometers. As used herein, the term "substantially free of visible particulate impurities" means that a ten gram sample of the poly(arylene ether) dissolved in fifty milliliters of chloroform ($CHCl_3$) exhibits fewer than 5 visible specks when viewed in a light box. Particles visible to the naked eye are typically those greater than 40 micrometers in diameter. As used herein, the term "substantially free of particulate impurities greater than 15 micrometers" means that of a forty gram sample of poly(arylene ether) dissolved in 400 milliliters of $CHCl_3$, the number of particulates per gram having a size of 15 micrometers is less than 50, as measured by a Pacific Instruments ABS2 analyzer based on the average of five samples of twenty milliliter quantities of the dissolved poly(arylene ether) that is allowed to flow through the analyzer at a flow rate of one milliliter per minute (plus or minus five percent).

In one embodiment the poly(arylene ether) can be present in the flame retardant thermoplastic composition in an amount of 5 to 65 weight percent, based on the total weight of the flame retardant thermoplastic composition. Within this range the poly(arylene ether) can be present in an amount greater than or equal to 10, or, more specifically, greater than or equal to 15 weight percent, or, even more specifically, greater than or equal to 17 weight percent, based on the total weight of the flame retardant thermoplastic composition. Also within this range the poly(arylene ether) can be present in an amount less than or equal to 50, or, more specifically, less than or equal to 45, or, even more specifically, less than or equal to 40 weight percent based on the total weight of the flame retardant thermoplastic composition.

Particularly suitable thermoplastic impact modifiers are block copolymers, for example, A-B diblock copolymers and A-B-A triblock copolymers having of one or two alkenyl aromatic blocks A, which are typically styrene blocks or blocks of a copolymer of styrene and one or more 1,3-cyclodienes such as 1,3-cyclohexadiene, and a rubber block, B, which can be a polymer or copolymer block resulting from the polymerization of a conjugated diene such as butadiene, a 1,3-cyclodiene such as 1,3-cyclohexadiene or a combination of conjugated dienes or a copolymer block resulting from the copolymerization of a conjugated diene and an alkenyl aromatic compound. The copolymer block itself can be a block copolymer. The repeating units resulting from the polymerization of the conjugated dienes can be partially or completely hydrogenated. After a repeating unit resulting from the polymerization of a conjugated diene has been hydrogenated the repeating unit may be described as an alkene unit. Each occurrence of alkenyl aromatic block A may have a molecular weight which is the same or different than other occurrences of alkenyl aromatic block A. Similarly each occurrence of rubber block B may have a molecular weight which is the same or different than other occurrences rubber block B.

Exemplary A-B and A-B-A copolymers include, but are not limited to, polystyrene-polybutadiene, polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-poly(ethylene-butylene)-polystyrene, polystyrene-(ethylene-butylene/styrene copolymer)-polystyrene, polystyrene-polyisoprene-polystyrene, and poly(alpha-methylstyrene)-polybutadiene-poly(alpha-methylstyrene), as well as the selectively hydrogenated versions thereof, and the like. Mixtures of the aforementioned block copolymers are also useful. Such A-B and A-B-A block copolymers are available commercially from a number of sources, including Phillips Petroleum under the trademark SOLPRENE, Kraton Polymers Ltd. under the trademark KRATON, Dexco under the trademark VECTOR, and Kuraray under the trademark SEPTON.

In one embodiment the impact modifier comprises impact modifiers having varying amounts of alkenyl aromatic units. For example a combination of a polystyrene-poly(ethylene-butylene)-polystyrene having a polystyrene content of 10 weight percent to 20 weight percent, based on the total weight of the block copolymer and a polystyrene-poly(ethylene-butylene)-polystyrene having a polystyrene content of 25 weight percent to 50 weight percent, based on the total weight of the block copolymer.

In one embodiment the impact modifier comprises a block copolymer having (A) one or more blocks comprising repeating alkenyl aromatic units and (C) one or more blocks that is a controlled distribution copolymer block. Block A may further comprise alkene units having 2 to 15 carbons as long as the quantity of alkenyl aromatic units exceeds the quantity of alkene units.

In one embodiment the impact modifier comprises two block copolymers, one of which is a block copolymer comprising a controlled distribution copolymer block.

A controlled distribution copolymer is a copolymer of alkenyl aromatic units and alkylene units having 2 to 15 carbons such as ethylene, propylene, butylene or combinations of two or more of the foregoing. The C block may comprise some unsaturated carbon-carbon bonds. "Controlled distribution copolymer block" refers to a molecular structure having the following attributes: (1) terminal regions adjacent to A blocks that are rich in (i.e., having a greater than an average amount of) alkylene units; (2) one or more regions not adjacent to the A blocks that are rich in (i.e., having a greater than average amount of) alkenyl aromatic units; and (3) an overall structure having relatively low alkenyl aromatic blockiness.

For the purposes hereof, "rich in" is defined as greater than the average amount, preferably at least 5% greater than the average amount.

Low blockiness can be shown by either the presence of only a single glass transition temperature (Tg) for the copolymer block, when analyzed using differential scanning calorimetry ("DSC") thermal methods or via mechanical methods, or shown by proton nuclear magnetic resonance ("H-NMR") methods.

The term "alkenyl aromatic blockiness", as measured by those skilled in the art using proton NMR (H-NMR), is defined to be the proportion of alkenyl aromatic units in the polymer having two nearest alkenyl aromatic neighbors on the polymer chain to the total number of alkenyl aromatic units. The alkenyl aromatic blockiness can be determined after using H-NMR to measure two experimental quantities. First, the total number of alkenyl aromatic units (i.e. arbitrary instrument units which cancel out when ratioed) is determined by integrating the total aromatic signal in the H-NMR spectrum from 7.5 to 6.2 ppm and dividing this quantity by the number of aromatic hydrogens on each aromatic ring (5 in the case of styrene). Second, the blocky alkenyl aromatic units are determined by integrating that portion of the aromatic signal in the H-NMR spectrum from the signal minimum between 6.88 and 6.80 to 6.2 ppm and dividing this quantity by 2 to account for the 2 ortho hydrogens on each blocky aryl alkylene aromatic ring. The assignment of this signal to the two ortho hydrogens on the rings of the alkenyl aromatic units which have two alkenyl aromatic nearest neighbors was reported in F. A. Bovey, *High Resolution NMR of Macromolecules* (Academic Press, New York and London, 1972), chapter 6. The alkenyl aromatic blockiness is simply the percentage of blocky alkenyl aromatic units to total alkenyl aromatic units: Blocky %=100 times (Blocky Styrene Units/Total Styrene Units).

The potential for blockiness can also be inferred from measurement of the UV-visible absorbance at a wavelength range suitable for the detection of polystyryllithium end groups during the polymerization of the C block. A sharp and substantial increase in this value is indicative of a substantial increase in polystyryllithium chain ends. This will only occur if the conjugated diene concentration drops below the level necessary, typically a concentration of 0.1% wt of diene, to maintain controlled distribution polymerization. Any alkenyl aromatic monomer that is present at this point will add in a blocky fashion.

In one embodiment the blocky % is less than or equal to 40. In one embodiment, the block copolymer has an alkenyl aromatic content of ten weight percent to forty weight percent, and the blocky % is less than or equal to 10 but greater than 0.

In one embodiment the block copolymer comprises an alkenyl aromatic/alkylene controlled distribution copolymer block, wherein the proportion of alkenyl aromatic units increases gradually to a maximum near the middle or center of the block and then decreases gradually until the opposite end of the polymer block is reached.

In one embodiment the first 15 to 25% and the last 15 to 85% of the alkenyl aromatic/alkylene controlled distribution copolymer block are alkylene rich, with the remainder considered to be alkenyl aromatic rich. The term "alkylene rich" means that the region has a measurably higher ratio of alkylene to alkenyl aromatic than the center region. For the controlled distribution copolymer block the weight percent of alkenyl aromatic in each controlled distribution copolymer block can be 10 weight percent to 75 weight percent, or more specifically 15 weight percent to 50 weight percent, based on the total weight of the controlled distribution copolymer block.

Anionic, solution copolymerization to form the controlled distribution copolymers can be carried out using known methods and materials. In general, the copolymerization is attained anionically, using known selections of adjunct materials, including polymerization initiators, solvents, promoters, and structure modifiers, but as a key feature, in the presence of a distribution agent. An exemplary distribution agent is a non-chelating ether. Examples of such ether compounds are cyclic ethers such as tetrahydrofuran and tetrahydropyrane and aliphatic monoethers such as diethyl ether and dibutyl ether. Production of block copolymers comprising a controlled distribution copolymer block is taught in United States Patent Application No. 2003/0176582.

One feature of the impact modifier comprising an alkenyl aromatic block and a controlled distribution copolymer block is that it can have two or more Tg's, the lower being the single Tg of the controlled distribution copolymer block. The controlled distribution copolymer block Tg is typically greater than or equal to –60° C., or, more specifically, greater than or equal to –40° C. The controlled distribution copolymer block Tg is typically less than or equal to +30° C., or, even more specifically, less than or equal to +10° C. The second Tg, that of the alkenyl aromatic block, is +80° C. to +110° C., or, more specifically, +80° C. to +105° C.

Each A block may have an average molecular weight of 3,000 to 60,000 g/mol and each C block may have an average molecular weight of 30,000 to 300,000 g/mol as determined by gel permeation chromatography using polystyrene standards. The total amount of alkenyl aromatic units is 15 to 75 weight percent, based on the total weight of the block copolymer. Exemplary block copolymers are further disclosed in U.S. Patent Applications Nos. 2003/181584, 2003/0176582, and 2004/0138371 and are commercially available from Kraton Polymers under the trademark KRATON. Exemplary grades are A-RP6936 and A-RP6935.

In one embodiment, the impact modifier can be functionalized in a number of ways. One way is by treatment with an unsaturated monomer having one or more functional groups or their derivatives, such as carboxylic acid groups and their salts, anhydrides, esters, imide groups, amide groups, and acid chlorides. Exemplary monomers include maleic anhydride, maleic acid, fumaric acid, and their derivatives. A further description of functionalizing such block copolymers can be found in U.S. Pat. No. 4,578,429 and in U.S. Pat. No. 5,506,299. In another manner, the impact modifier can be functionalized by grafting silicon or boron containing compounds to the polymer as taught in U.S. Pat. No. 4,882,384. In still another manner, the impact modifier can be contacted with an alkoxy-silane compound to form a silane-modified block copolymer. In yet another manner, the impact modifier can be functionalized by grafting at least one ethylene oxide molecule to the polymer as taught in U.S. Pat. No. 4,898,914, or by reacting the polymer with carbon dioxide as taught in U.S. Pat. No. 4,970,265. Still further, the impact modifier can be metallated as taught in U.S. Pat. Nos. 5,206,300 and 5,276,101, wherein the polymer is contacted with an alkali metal alkyl, such as a lithium alkyl. And still further, the impact modifier can be functionalized by grafting sulfonic groups to the polymer as taught in U.S. Pat. No. 5,516,831.

In some embodiments the impact modifier is present in an amount sufficient to attain a combination of softness (as described above by Shore A and Shore D) and flexural modulus (as described above). The impact modifier can be present in the flame retardant thermoplastic composition in an amount of 5 to 55 weight percent, based on the total weight of the flame retardant thermoplastic composition. Within this range the impact modifier can be present in an amount greater than or equal to 8, or, more specifically, greater than or equal to 12, or, even more specifically, greater than or equal to 15 weight percent based on the total weight of the flame retardant thermoplastic composition. Also within this range the impact modifier can be present in an amount less than or equal to 50, or, more specifically, less than or equal to 46, or, even more specifically, less than or equal to 42 weight percent based on the total weight of the flame retardant thermoplastic composition.

The flame retardant thermoplastic composition may optionally comprise a polyolefin. Polyolefins which can be included are of the general structure: $C_nH_{2n}$ and include, for example, polyethylene, polybutene, polypropylene, polyisobutylene, and combinations of one or more of the foregoing, with preferred homopolymers being polybutene, polyethylene, LDPE (low density polyethylene), LLDPE (linear low density polyethylene), HDPE (high density polyethylene), MDPE (medium density polyethylene), polypropylene, and combinations of two or more of the foregoing. Polyolefin resins of this general structure and methods for their preparation are well known in the art and are described for example in U.S. Pat. Nos. 2,933,480, 3,093,621, 3,211,709, 3,646,168, 3,790,519, 3,884,993, 3,894,999, 4,059,654, 4,166,055 and 4,584,334.

Copolymers of polyolefins may also be used such as copolymers of ethylene and alpha olefins having three to twelve carbons or functionalized alpha olefins having three to twelve carbons. Exemplary alpha olefins include propylene and 4-methylpentene-1,1-butene, 2-butene, 1-pentene, 2-pentene, 1-hexene, 2-hexene and 3-hexene etc. Exemplary functionalized alpha olefins include olefins such as ethylene functionalized with vinyl acetate, ethylene functionalized with acrylate and ethylene functionalized with substituted acrylate groups. Copolymers of ethylene and $C_3$-$C_{10}$ monoolefins and non-conjugated dienes, herein referred to as EPDM copolymers, are also suitable. Examples of suitable $C_3$-$C_{10}$ monoolefins for EPDM copolymers include propylene, 1-butene, 2-butene, 1-pentene, 2-pentene, 1-hexene, 2-hexene and 3-hexene. Suitable dienes include 1,4 hexadiene and monocylic and polycyclic dienes. Mole ratios of ethylene to other $C_3$-$C_{10}$ monoolefin monomers can range from 95:5 to 5:95 with diene units being present in the amount of from 0.1 to 10 mol %. EPDM copolymers can be functionalized with an acyl group or electrophilic group for grafting onto the polyphenylene ether as disclosed in U.S. Pat. No. 5,258,455.

In one embodiment the flame retardant thermoplastic composition comprises a liquid polyolefin, or, more specifically, a liquid polybutene. "Liquid" as used herein with reference to a polyolefin is defined as having a viscosity less than or equal to 700 centiStokes (cSt), or, more specifically, less than or equal to 300 cSt, as determined by ASTM D445 at 100° C. The viscosity of the polyolefin is greater than or equal to 70 cSt as determined by ASTM D445 at 100° C.

The polyolefin, when used, can be present in the flame retardant thermoplastic composition in an amount of 2 to 50 weight percent, based on the total weight of the flame retardant thermoplastic composition. Within this range the polyolefin can be present in an amount greater than or equal to 2, or, more specifically, greater than or equal to 5, or, even more specifically, greater than or equal to 7 weight percent based on the total weight of the flame retardant thermoplastic composition. Also within this range the polyolefin can be present in an amount less than or equal to 40, or, more specifically, less than or equal to 30, or, even more specifically, less than or equal to 25 weight percent based on the total weight of the flame retardant thermoplastic composition.

The flame retardant thermoplastic composition may optionally comprise a poly(alkenyl aromatic) resin. The term "poly(alkenyl aromatic) resin" as used herein includes polymers prepared by methods known in the art including bulk, suspension, and emulsion polymerization, which contain at least 25% by weight of structural units derived from an alkenyl aromatic monomer of the formula

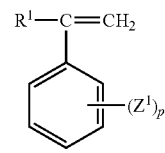

wherein $R^1$ is hydrogen, $C_1$-$C_8$ alkyl, or halogen; $Z^1$ is vinyl, halogen or $C_1$-$C_8$ alkyl; and p is 0 to 5. Preferred alkenyl aromatic monomers include styrene, chlorostyrene, and vinyltoluene. The poly(alkenyl aromatic) resins include homopolymers of an alkenyl aromatic monomer; non-elastomeric random, radial and tapered block copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly(alkenyl aromatic) resins comprising blends and/or grafts of a rubber modifier and a homopolymer of an alkenyl aromatic monomer (as described above), wherein the rubber modifier can be a polymerization product of at least one $C_4$-$C_{10}$ nonaromatic diene monomer, such as butadiene or isoprene, and wherein the rubber-modified poly(alkenyl aromatic) resin comprises 98 to 70 weight percent of the homopolymer of an alkenyl aromatic monomer and 2 to 30 weight percent of the rubber modifier. Rubber-modified polystyrenes are also known as high-impact polystyrenes or HIPS. In one embodiment the rubber-modified poly(alkenyl aromatic) resin comprises 88 to 94 weight percent of the homopolymer of an alkenyl aromatic monomer and 6 to 12 weight percent of the rubber modifier.

The composition may comprise the poly(alkenyl aromatic) resin, when present, in an amount of 1 to 46 weight percent, based on the total weight of the flame retardant thermoplastic composition. Within this range the poly(alkenyl aromatic) resin can be present in an amount greater than or equal to 2, or, more specifically, greater than or equal to 4, or, even more specifically, greater than or equal to 6 weight percent based on the total weight of the flame retardant thermoplastic composition. Also within this range the poly(alkenyl aromatic) resin can be present in an amount less than or equal to 25, or, more specifically, less than or equal to 20, or, even more specifically, less than or equal to 15 weight percent based on the total weight of the flame retardant thermoplastic composition.

In general the fire retardant thermoplastic composition comprises the fire retardant additive composition in an amount sufficient to attain a V2 rating or better at a thickness of 3.2 millimeters according to UL94. The fire retardant thermoplastic composition may comprise the fire retardant additive in an amount of 15 to 45 weight percent, based on the total weight of the thermoplastic composition. Within this range the fire retardant additive composition can be present in an amount greater than or equal to 18, or, more specifically, greater than or equal to 20, or, even more specifically, greater than or equal to 23 weight percent based on the total weight of the flame retardant thermoplastic composition. Also within this range the fire retardant additive composition can be present in an amount less than or equal to 40, or, more specifically, less than or equal to 35, or, even more specifically, less than or equal to 32 weight percent based on the total weight of the flame retardant thermoplastic composition.

Additionally, the fire retardant thermoplastic composition may optionally also contain various additives, for example antioxidants, such as organophosphites, including tris(nonylphenyl)phosphite, tris(2,4-di-t-butylphenyl)phosphite, bis(2, 4-di-t-butylphenyl)pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)] methane, 2,4-di-tert-butylphenyl phosphite, butylated reaction products of paracresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols, esters of thioalkyl or thioaryl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as silicates, $TiO_2$, fibers, glass fibers (including continuous and chopped fibers), carbon black, graphite, calcium carbonate, talc, and mica; mold release agents; UV absorbers; stabilizers such as light stabilizers and others; lubricants; plasticizers; pigments; dyes; colorants; anti-static agents; and blowing agents.

In some embodiments it is desirable to make fire retardant thermoplastic compositions in a variety of colors. One method of achieving this is to manufacture the fire retardant thermoplastic composition in a single color and then modify the color by using a color concentrate which comprises a resin with a dye or colorant in a concentration significantly higher than that found in the final composition. In some embodiments it may be necessary to adjust the composition of the single color fire retardant thermoplastic composition to accomodate the later inclusion of the color masterbatch to achieve a final colored fire retardant thermoplastic composition having the amounts of components as described above.

The flame retardant thermoplastic composition is blended under conditions appropriate to the formation of an intimate blend. The components are combined and mixed, using equipment such as an extruder or kneader, typically at a temperature sufficient to allow melt mixing without substantial decomposition of any of the components. In one embodiment components can be blended in a twin screw extruder at a temperature of 200° C. to 300° C. If using, for example, a 53 millimeter twin screw extruder the screw speed can be 200 to 600 rotations per minute (rpm).

In one embodiment the phosphoric acid salt, metal hydroxide and organic phosphate are blended with a thermoplastic either at a temperature above the melt temperature of the thermoplastic (melt mixing) or at a temperature below the melt temperature of the thermoplastic to form a masterbatch. The masterbatch can then be melt mixed with the components of the flame retardant composition. The masterbatch can be added initially or after some mixing of the components of flame retardant composition.

In another embodiment the phosphoric acid salt, metal hydroxide and organic phosphate are premixed, without thermoplastic, to form a flame retardant additive mixture. The flame retardant additive mixture can be added at any point along the formation of the flame retardant thermoplastic composition such as at the beginning of the melt mixing of the thermoplastic or during the melt mixing of the thermoplastic. Alternatively the flame retardant additive mixture can be melt mixed with a pelletized thermoplastic blend.

In another embodiment the phosphoric acid salt, metal hydroxide, and organic phosphate are added directly to the components of the thermoplastic composition. They can be added together or separately and at any point during melt mixing provided the composition is sufficiently melt mixed to disperse the flame retardant additive composition components.

In one embodiment a fire retardant additive masterbatch comprises 30 to 70 of the flame retardant additive composition and 30 to 70 of a diluent material. The diluent material can be a solid or liquid and may serve as a binder for the fire retardant additive composition. While the identity of the diluent is not crucial the choice of diluent material is typically made with consideration of the resin or resins the masterbatch is to be combined with. For example if the masterbatch is to be combined with poly(arylene ether) the choices for the diluent material could include poly(arylene ether) or a material compatible with poly(arylene ether) such as polystyrene, polyolefin as described above, or impact modifier as described above.

In some embodiments the flame retardant thermoplastic composition is essentially free of compounds having a functional group reactive to an active hydrogen atom such as compounds having a functional group selected from a cyclic ether group (e.g., an epoxy group), an acid anhydride group, an isocyanate group, an oxazoline group, an oxazine group, or a carbodiimide group. The flame retardant thermoplastic composition may also be free of fluorine-containing oligomers, and/or silicone-series resins such as poly(organosiloxane). In the absence of compounds having a functional group reactive to an active hydrogen atom, fluorine-containing oligomers, and/or silicone-series resins the flame retardant composition retains hydrolysis resistance. Hydrolysis resistance can be determined by injection molding the composition into a test piece for ISO tensile test and carrying out the PCT test (measurement conditions: 121° C.×100% RH, 2 atmospheres, and 24 hours). The tensile strengths before and after PCT test are measured, and the retention (%) of the tensile strength is an index of hydrolysis resistance. The composition typically retains 75% to 100% of tensile strength. Within this range the composition can retain greater than or equal to 80% of tensile strength, or, more specifically, greater than or equal to 85% of the tensile strength.

"Essentially free" as used herein means that the composition contains less than 1 weight percent, or, more specifically, less than 0.5 weight percent, or, even more specifically, less than 0.05 weight percent, based on the total weight of the composition.

The compositions are further illustrated by the following non-limiting examples.

EXAMPLES

The following examples employed the materials listed in Table 1. All weight percents employed in the examples are based on the weight of the entire composition except where stated.

TABLE 1

| Component | Description/Supplier |
|---|---|
| PPE | Poly(phenylene ether) having an intrinsic viscosity of 0.46 g/dl when measured in chloroform at 25° C. |
| SEBS I | Polystyrene-poly(ethylene-butylene)-polystyrene having a polystyrene content of 13 weight percent that is commercially available from Kraton Polymers Ltd under the tradename Kraton G1657. |
| SEBS II | Polystyrene-poly(ethylene-butylene)-polystyrene having a polystyrene content of 30 weight percent that is commercially available from Kraton Polymers Ltd under the tradename Kraton G1650. |
| SEBS III | Polystyrene-poly(ethylene-butylene-styrene)-polystyrene having 39% polystyrene content and commercially available from Kraton Polymers Ltd under the tradename Kraton A, grade RP 6936. |
| SEBS IV | Polystyrene-poly(ethylene-butylene)-polystyrene having a polystyrene content of 30 weight percent that is commercially available from Kraton Polymers Ltd under the tradename Kraton G1652. |
| SEBS V | Blend of polystyrene-poly(ethylene-butylene)-polystyrene, a copolymer of ethylene-propylene and mineral oil that is commercially available from Sumitomo Chemical under the tradename SB-2400. |
| LLDPE | Linear low density polyethylene commercially available from Nippon Unicar Co. Ltd under the tradename NUCG5381. |
| Polybutene I | Polybutene having a viscosity of 200-235 cSt at a temperature of 100° C., commercially available from BP Chemical under the tradename Indopol, grade H100. |
| Polybutene II | Polybutene having a viscosity of 100-115 cSt at a temperature of 100° C. commercially available from BP Chemical under the tradename Indopol, grade H50. |
| RDP | Resorcinol bis-diphenylphosphate commercially available from Great Lakes Chemical Co. Ltd. under the trade name of Reofos RDP. |
| MPP | Melamine polyphosphate commercially available from Ciba Specialty Chemical Co. Ltd under the tradename Melapur 200. |
| MP | Melamine pyrophosphate commercially available from Budenheil under the tradename Budit 311MPP. |
| $Mg(OH)_2$ | Magnesium hydroxide commercially available from Kyowa Chemical Industry Co. Ltd. under the trade name of Kisuma 5A. |
| BTPP | Butylated triphenyl phosphate commercially available from Akzo Nobel Chemical Inc. under the tradename Phosflex 71B. |
| TPP | Triphenyl phosphate commercially available from Akzo Nobel Chemical Inc. under the tradename Phosflex TPP. |
| BPADP | Bisphenol A bis-diphenylphosphate commercially available from Akzo Nobel Chemicals Inc under the tradename of Fyroflex BDP. |
| LDPE | Low density polyethylene commercially available from Nippon Unicar Co. Ltd under the tradename NUC8042. |

TABLE 1-continued

| Component | Description/Supplier |
|---|---|
| EVA | Ethylene-vinyl acetate copolymer commercially available from Dupont Mitsui Polymers Co Ltd under the tradename Elvaloy A710. |
| EEA | Ethylene-ethyl acrylate copolymer commercially available from Nippon Unicar Co. Ltd under the tradename NUC8451. |

Examples 1-9

A thermoplastic composition containing 38.5 weight percent PPE, 26.9 weight percent SEBS I, 25.6 weight percent LLDPE and 9.0 weight percent polybutene, based on the total weight of thermoplastics was melt mixed with RDP, MPP, and $Mg(OH)_2$ in the amounts shown in Table 2. The amounts of RDP, MPP and $Mg(OH)_2$ amounts are shown in parts per hundred parts of thermoplastic composition (PPE+SEBS I+LLDPE+polybutene). The composition was molded into 3.2 millimeter bars for flammability testing. Flammability tests were performed following the procedure of Underwriter's Laboratory Bulletin 94 entitled "Tests for Flammability of Plastic Materials, UL94". Each bar that extinguished was ignited twice. According to this procedure, the materials were classified as either HB, V0, V1 or V2 on the basis of the test results obtained for five samples. The criteria for each of these flammability classifications according to UL94, are, briefly, as follows.

HB: In a 5 inch sample, placed so that the long axis of the sample is parallel to the flame, the rate of burn of the sample is less than 3 inches per minute, and the flames should be extinguished before 4 inches of sample are burned.

V0: In a sample placed so that its long axis is parallel to the flame, the average period of flaming and/or smoldering after removing the igniting flame should not exceed five seconds and none of the vertically placed samples should produce drips of burning particles which ignite absorbent cotton.

V1: In a sample placed so that its long axis is parallel to the flame, the average period of flaming and/or smoldering after removing the igniting flame should not exceed twenty-five seconds and none of the vertically placed samples should produce drips of burning particles which ignite absorbent cotton.

V2: In a sample placed so that its long axis is parallel to the flame, the average period of flaming and/or smoldering after removing the igniting flame should not exceed twenty-five seconds and the vertically placed samples produce drips of burning particles which ignite cotton.

Results are shown in Table 2. Burn time is the sum of the amounts of time the bar burned each time it was lit. "Burn" indicates that the bar did not self-extinguish. "NA" in the UL94 rating column means that the sample did not fall within the parameters of any of the UL94 ratings.

TABLE 2

| Example | RDP | MPP | $Mg(OH)_2$ | Burn time | UL94 rating |
|---|---|---|---|---|---|
| 1* | 19.3 | 19.3 | 0 | Burn | NA |
| 2 | 19.3 | 19.3 | 8.3 | 5.5 | V0 |
| 3 | 19.3 | 19.3 | 13.9 | 1.5 | V0 |
| 4* | 27.7 | 16.6 | 0 | Burn | NA |
| 5 | 27.7 | 11.1 | 8.3 | 3.8 | V0 |

TABLE 2-continued

| Example | RDP | MPP | Mg(OH)$_2$ | Burn time | UL94 rating |
|---|---|---|---|---|---|
| 6* | 24.9 | 0 | 12.5 | Burn | NA |
| 7* | 0 | 27.7 | 8.3 | Burn | NA |
| 8* | 23.8 | 19.1 | 0 | Burn | NA |
| 9* | 22.2 | 19.4 | 0 | Burn | NA |

*Comparative Example

Examples 1-9 demonstrate that all three components of the flame retardant additive composition are required for flame retardance. Examples 1, 4, 8, and 9 all lack magnesium hydroxide and none of these samples self-extinguished. Example 6 lacked melamine polyphosphate and did not self extinguish. Example 7 lacked resorcinol diphosphate and it too did not self extinguish. The fact that all three components of the fire retardant additive composition are required indicates an unexpected synergistic relationship between the three components.

Examples 10-15

A thermoplastic composition containing 42.6 weight percent PPE, 32.0 weight percent SEBS I, 21.4 weight percent LLDPE and 4.0 weight percent polybutene, based on the total weight of thermoplastics, was melt mixed with BTPP, RDP, MPP, and Mg(OH)$_2$ in the amounts shown in Table 3. BTPP, RDP, MPP, and Mg(OH)$_2$ amounts are in parts per hundred parts of thermoplastic composition (PPE+SEBS I+LLDPE+polybutene). The composition was molded into 3.2 millimeter bars for flammability testing and tested as described in Examples 1-9.

TABLE 3

| Example | BTPP | RDP | MPP | Mg(OH)$_2$ | Burn time | UL94 rating |
|---|---|---|---|---|---|---|
| 10 | 3.9 | 19.3 | 11.4 | 7.7 | 5.2 | V0 |
| 11 | 0 | 19.3 | 11.4 | 7.7 | 17.4 | V1 |
| 12 | 0 | 24.4 | 12.8 | 7.7 | 2.9 | V0 |
| 13 | 0 | 25.7 | 7.7 | 7.7 | 1.9 | V0 |
| 14 | 6.4 | 19.3 | 11.4 | 11.4 | 24.2 | V1 |
| 15 | 10.3 | 15.4 | 7.7 | 10.3 | 8.8 | V0 |

Examples 10-15 demonstrate that combinations of organic phosphate are useful in the flame retardant additive composition and that excellent flame retardance (V1 and V0) can be achieved with the fire retardant additive composition.

Examples 16-19

26 weight percent PPE, 25 weight percent SEBS I, 15.0 weight percent polyethylene copolymer (as shown in Table 4) and 2 weight percent polybutene, based on the total weight of the composition, were melt mixed with BTPP, RDP, MPP, and Mg(OH)$_2$ in the amounts shown in Table 4. BTPP, RDP, MPP, and Mg(OH)$_2$ amounts are shown in weight percent, based on the total weight of the composition. The compositions were molded into 2.0 millimeter bars for flammability testing and tested as described in Examples 1-9. In Example 19 one out of 10 burns caused dripping at 20 seconds, which resulted in a V2 rating.

TABLE 4

| Example | PE copolymer | BTPP | RDP | MPP | Mg(OH)$_2$ | Burn time | UL94 rating |
|---|---|---|---|---|---|---|---|
| 16 | LDPE | 8.0 | 12.0 | 5.0 | 7.0 | 3.4 | V0 |
| 17 | LLDPE | 8.0 | 12.0 | 5.0 | 7.0 | 9.5 | V1 |
| 18 | EEA | 8.0 | 12.0 | 5.0 | 7.0 | 3.1 | V0 |
| 19 | EVA | 8.0 | 12.0 | 5.0 | 7.0 | 12.3 | V2 |

Examples 16-19 demonstrate that compositions containing a significant amount of polyolefin and comprising a variety of polyethylene copolymers can stain a V2 rating or better using the flame retardant additive composition.

Example 20

26 weight percent PPE, 25 weight percent SEBS I, 15.0 weight percent EEA and 2 weight percent polybutene were melt mixed with 8.0 weight percent BTPP, 12.0 weight percent RDP, 5.0 weight percent melamine cyanurate, and 7 weight percent Mg(OH)$_2$, where all weight percents are based on the total weight of the composition. The composition was molded into 2.0 millimeter bars for flammability testing and tested as described in Examples 1-9. The composition did not self extinguish indicating that phosphoric acid salt cannot be replaced by a nitrogen containing compound free of phosphorous, further confirming the surprising synergistic relationship between the three components of the fire retardant additive composition.

Examples 21-33

Compositions according to the formulations shown in Table 5 were made and tested for tensile strength and elongation according to ASTM D 638, flexural modulus according to ASTM D790 and shore A hardness according to ASTM D2240. Formulation amounts are in weight percent based on the total weight of the compositions. Tensile strength values are in megapascals (MPa) and tensile elongation values are in percent. Flexural modulus values are in MPa.

The compositions were molded into 2.0 millimeter bars for flammability testing and tested as described in Examples 1-9. Results are shown in Table 6.

TABLE 5

| Example | PPE | SEBS I | SEBS II | LLDPE | EEA | LDPE | PB | MPP | Mg(OH)$_2$ | BTPP | RDP |
|---|---|---|---|---|---|---|---|---|---|---|---|
| 21 | 25.2 | 29.1 | — | — | 13.6 | — | 2.9 | 4.9 | 6.8 | 7.8 | 9.7 |
| 22 | 25.9 | 23.5 | 3.0 | — | 14.3 | — | 2.7 | 5.4 | 7.0 | 7.1 | 10.7 |
| 23 | 25.0 | 25.5 | 3.8 | — | 10.6 | — | 2.9 | 5.3 | 7.7 | 7.7 | 11.5 |
| 24 | 25.2 | 26.2 | 1.9 | — | 14.6 | — | 2.9 | 4.9 | 5.8 | 8.7 | 9.7 |
| 25 | 25.2 | 26.2 | 1.9 | 2.9 | 14.6 | — | — | 4.9 | 5.8 | 8.7 | 9.7 |
| 26 | 25.2 | 28.2 | — | — | 17.5 | — | — | 5.3 | 5.3 | 8.7 | 9.7 |
| 27 | 30.8 | 21.5 | — | 15.0 | — | — | 2.8 | 5.6 | 5.6 | — | 18.7 |
| 28 | 26.1 | 23.4 | — | 17.1 | — | — | 2.7 | 8.1 | 4.5 | 4.5 | 13.5 |
| 29 | 32.0 | 35.0 | — | — | 5.0 | — | — | 5.0 | 6.0 | — | 17.0 |
| 30 | 35.0 | 20.0 | — | — | 17.0 | — | — | 5.0 | 6.0 | — | 17.0 |
| 31 | 35.0 | 22.0 | 10.0 | — | 5.0 | — | — | 5.0 | 6.0 | — | 17.0 |

TABLE 5-continued

| Example | PPE | SEBS I | SEBS II | LLDPE | EEA | LDPE | PB | MPP | Mg(OH)$_2$ | BTPP | RDP |
|---|---|---|---|---|---|---|---|---|---|---|---|
| 32 | 26.0 | 27.0 | — | — | — | 14.0 | 2.0 | 5.0 | 6.0 | 9.0 | 11.0 |
| 33 | 25.1 | 28.2 | — | — | 14.6 | — | 2.9 | 4.9 | 6.8 | 7.8 | 9.7 |

TABLE 6

| Example | Tensile Strength (MPa) | Tensile Elongation (%) | Flexural Modulus (MPa) | Durometer Hardness (Shore A) | UL 94V Rating |
|---|---|---|---|---|---|
| 21 | 8.7 | 173 | 81 | 82 | V1 |
| 22 | 12.4 | 179 | 257 | 88 | V1 |
| 23 | 11.3 | 192 | 246 | 88 | V1 |
| 24 | 11.0 | 187 | 150 | 85 | V0 |
| 25 | 11.2 | 175 | 214 | 89 | V0 |
| 26 | 10.7 | 164 | 196 | 87 | V1 |
| 27 | 13.9 | 114 | 328 | 92 | V1 |
| 28 | 9.5 | 155 | 161 | 88 | V1 |
| 29 | 14.3 | 175 | 310 | 91 | V1 |
| 30 | 17.6 | 103 | 530 | 95 | V0 |
| 31 | 18.1 | 105 | 666 | 97 | V0 |
| 32 | 13.4 | 163 | 322 | 91 | V0 |
| 33 | 9.0 | 170 | 102 | 83 | V1 |

The data in Table 6 demonstrates that the fire retardant thermoplastic composition can obtain a surprising combination of physical properties, namely softness, flexibility and tensile strength as well as flame retardance, without the use of halogenated flame retardants. None of Examples 21-33 exhibited plate out or migration by visual inspection.

Additionally Examples 22, 23 and 33 were tested for viscosity using a capillary viscometer having a length to diameter ratio of 10. Viscosity values are in Pascal seconds (Pa s). Data for Example 22 is shown in Table 7. Data for Example 23 is shown in Table 8. Data for Example 33 is shown in Table 9.

TABLE 7

| | Shear rate (s$^{-1}$) | | | | |
|---|---|---|---|---|---|
| Temperature | 10 | 100 | 1,000 | 4,000 | 10,000 |
| 210° C. | 2584 | 1002 | 293 | 134 | 81 |
| 230° C. | 2031 | 650 | 199 | 90 | 53 |
| 250° C. | 826 | 474 | 143 | 70 | 40 |

TABLE 8

| | Shear rate (s$^{-1}$) | | | | |
|---|---|---|---|---|---|
| Temperature | 10 | 100 | 1,000 | 4,000 | 10,000 |
| 210° C. | 2022 | 959 | 283 | 128 | 73 |
| 230° C. | 2189 | 632 | 196 | 88 | 50 |
| 250° C. | 1608 | 453 | 139 | 68 | 40 |

TABLE 9

| | Shear rate (s$^{-1}$) | | | | |
|---|---|---|---|---|---|
| Temperature | 10 | 100 | 1,000 | 4,000 | 10,000 |
| 210° C. | 1988 | 750 | 237 | 113 | 71 |
| 230° C. | 1384 | 534 | 175 | 83 | 50 |
| 250° C. | 1001 | 373 | 126 | 63 | 38 |

The data in Tables 7-9 demonstrate that the compositions have excellent processability, particularly for extrusion processes.

Examples 34-37

Compositions according to the formulations shown in Table 10 were made and tested for tensile strength and elongation according to ASTM D 638, flexural modulus according to ASTM D790 and shore A hardness according to ASTM D2240. Formulation amounts are in weight percent based on the total weight of the composition. Tensile strength values are in megapascals (MPa) and tensile elongation values are in percent. Flexural modulus values are in MPa.

The compositions were molded into 3.2 millimeter bars for flammability testing and tested as described in Examples 1-9. Results are shown in Table 11.

TABLE 10

| Example | PPE | SEBS III | EEA | LLDPE | PB | MPP | Mg(OH)$_2$ | RDP |
|---|---|---|---|---|---|---|---|---|
| 34 | 19.0 | 30.0 | — | 19.0 | 6.0 | 5.0 | 6.0 | 15.0 |
| 35 | 25.8 | 28.3 | 12.9 | — | 5.3 | 4.8 | 5.7 | 17.2 |
| 36 | 23.0 | 31.1 | 12.9 | — | 5.3 | 4.8 | 5.7 | 17.2 |
| 37 | 25.8 | 31.1 | 10.1 | — | 5.3 | 4.8 | 5.7 | 17.2 |

TABLE 11

| Example | Tensile Strength (MPa) | Tensile Elongation (%) | Flexural Modulus (MPa) | Durometer Hardness (Shore A) | UL 94V Rating |
|---|---|---|---|---|---|
| 34 | 13.8 | 292 | 210- | 89 | V1 |
| 35 | 15.8 | 227 | 306 | 92 | V0 |
| 36 | 13.5 | 279 | 235 | 89 | V0 |
| 37 | 15.9 | 224 | 290 | 91 | V0 |

Examples 34 through 37 demonstrate flame retardant thermoplastic materials having an excellent combination of properties, notably high values for tensile elongation indicating materials having a resistance to breakage under stress such as stress exerted by pulling. The flame retardant thermoplastic materials also demonstrate a combination of softness (as demonstrated by the Shore A values), good flame resistance, tensile strength, and flexural modulus.

Examples 38-42

Examples 38 through 42 demonstrate the wire properties made from flame retardant thermoplastic compositions of 38 through 42. Compositions according to the formulations shown in Table 12 were made and tested for tensile strength and elongation according to ASTM D 638, flexural modulus according to ASTM D790 and shore A hardness according to ASTM D2240. Formulation amounts are in weight percent based on the total weight of the composition. Tensile strength values are in megapascals (MPa) and tensile elongation values are in percent. Flexural modulus values are in MPa. The compositions were molded into 3.2 millimeter bars for flammability testing and tested as described in Examples 1-9. Results are shown in Table 13. Copper wire having a cross sectional area of 0.75 square millimeters was extrusion coated with the compositions of Examples 38-42. The coating had a thickness of 0.6 millimeters. The coating was tested for tensile strength and ultimate elongation according to UL 1581 and the entire wire was tested for flame retardance according to UL 1581.

Examples 1-9. Results are shown in Table 14. In addition electrical wires were made using the compositions of Examples 43-61. The conductor was a 20×0.12 millimeter copper conductor and the covering had a thickness of approximately 0.7 millimeters. The covering was tested for tensile strength (in MPa) and ultimate elongation (in %) according to UL 1581 and the entire wire was tested for flame retardance according to UL 1581. Some examples were also tested for heat deformation according to UL 1581 at 121° C.

TABLE 12

| Example | PPE | SEBS I | SEBS IV | SEBS III | EEA | LLDPE | PB | MPP | Mg(OH)$_2$ | RDP |
|---|---|---|---|---|---|---|---|---|---|---|
| 38 | 20.0 | — | — | 29.0 | — | 18.0 | 7.0 | 5.0 | 6.0 | 15.0 |
| 39 | 29.0 | 5.0 | — | 27.0 | 10.0 | — | 6.5 | 4.0 | 4.5 | 14.0 |
| 40 | 31.7 | 26.2 | — | — | — | 13.4 | 2.0 | 5.4 | 5.4 | 15.8 |
| 41 | 35.3 | 28.7 | 3.9 | — | — | 3.9 | 2.9 | 4.0 | 4.6 | 16.7 |
| 42 | 30.5 | 11.0 | — | 20.0 | 6.5 | — | 6.0 | 5.0 | 5.0 | 16.0 |

TABLE 13

| Example | Tensile Strength (MPa) | Tensile Elongation (%) | Flexural Modulus (MPa) | Durometer Hardness (Shore A) | UL 94V Rating | Coating Tensile Strength (MPa) | Ultimate Elongation (%) | UL 1581 VW-1 |
|---|---|---|---|---|---|---|---|---|
| 38 | 13.5 | 245 | 195 | 89 | V1 | 14.7 | 260 | Pass |
| 39 | 13.4 | 170 | 117 | 84 | V2 | 21.0 | 245 | Pass |
| 40 | 14.2 | 125 | 210 | 89 | V0 | 16.4 | 134 | Pass |
| 41 | 16.5 | 110 | 300 | 91 | V0 | 20.0 | 165 | Pass |
| 42 | 15.0 | 120 | 227 | 90 | V0 | 18.9 | 193 | Pass |

Examples 43-60

Compositions according to the formulations shown in Table 14 were made and tested for tensile strength and elongation according to ASTM D 638, flexural modulus according to ASTM D790 and Shore A hardness according to ASTM D2240. The compositions also contained 1.7% weight percent of stabilizers and additives. Formulation amounts are in weight percent based on the total weight of the composition. Tensile strength values are in megapascals (MPa) and tensile elongation values are in percent. Flexural modulus values are in MPa. The compositions were molded into 3.2 millimeter bars for flammability testing and tested as described in Examples 1-9. Tensile strength values are in megapascals (MPa) and tensile elongation values are in percent. Flexural modulus values are in MPa. Heat deformation values are in percentage. Migration was determined by putting two electrical wires in between two plates made of polystyrene or two plates made of ABS to form a stack. Prior to placing the electrical wires between the plates the wires were visually inspected to verify that they were free of dust or other obvious contamination. A 500 gram weight was placed on top of the stack to form a weighted stack. The weighted stack was then put into an oven at 60° C. After 48 hours at 60° C., the stack was removed from the oven and disassembled. The surface of the plates that was in contact with the wires was visually inspected for marks left by the wires during the test.

TABLE 14

| | 43 | 44 | 45 | 46 | 47 | 48 | 49 | 50 | 51 | 52 | 53 | 54 | 55 | 56 | 57* | 58* | 59* | 60* |
|---|---|---|---|---|---|---|---|---|---|---|---|---|---|---|---|---|---|---|
| PPE | 30 | 32 | 31 | 30 | 31 | 30 | 31 | 30 | 30 | 33 | 28 | 28 | 25 | 28 | 31 | 23 | 29 | 25 |
| SEBS V | 15 | — | 15 | 16 | 15 | 15.5 | 15 | 15.5 | 15.5 | 13 | 17 | 17 | 17 | 17 | 13 | 19 | 17 | 17 |
| SEBS III | 22 | 17 | 22 | 22 | 22 | 21.5 | 22 | 22 | 21.5 | 22 | 21 | 21 | 24 | 21 | 24 | 24 | 22 | 22 |
| SEBS I | — | 11 | — | — | — | — | — | — | — | — | — | — | — | — | — | — | — | — |
| LLDPE | — | 8 | — | — | — | — | — | — | — | — | — | — | — | — | — | — | — | — |
| MPP | 10 | 10 | 5 | 10 | 10 | 7.4 | 9 | 6 | 7.3 | 12 | 5 | 6 | 5 | 5 | 5 | 5 | 5 | 5.5 |
| Mg(OH)2 | 6 | 6 | 6 | 6 | 7 | 7.4 | 8 | 7 | 7.9 | 7 | 5 | 6 | 6 | 5 | 5 | 5 | 5 | 5.5 |
| MP | — | — | 5 | — | — | 5.2 | — | 5 | 5.5 | — | 8 | 11 | 8 | 11 | — | — | — | — |
| Polybutene II | 7 | 7 | 7 | 7 | 7 | 7 | 7 | 7 | 7 | 7 | 8 | 8 | 8 | 8 | 9 | 9 | 7 | 8.5 |
| BPADP | — | — | — | — | — | — | — | — | — | — | — | — | — | — | — | — | — | 16.5 |
| RDP | 10 | 9 | 9 | 9 | 8 | 6 | 8 | 7.5 | 5 | 5 | 8 | 3 | 7 | 5 | 13 | 16 | 15 | — |
| Shore A | 87.8 | 88.9 | 85.3 | 84.1 | 84.6 | 83.4 | 84.8 | 83.7 | 82.2- | 85.7 | 79.5 | 81.2 | 77.4 | 81.1 | 81.5 | 80.5 | 86.4 | 86 |
| FM | 173 | 180 | 125 | 103 | 63 | 83 | 75 | 93 | — | 62 | 71 | 77 | 62 | 83 | 79 | 95 | 176 | 160 |
| TS | 15.6 | 13.5 | 15.5 | 13.2 | 13.4 | 12.7 | 13.5 | 13.7 | 11.2- | 12.9 | 11.5 | 13.1 | 10.2 | 12.1 | 13.1 | 12.5 | 14.4 | 12.7 |
| TE | 110 | 91 | 122 | 130 | 126 | 104 | 116 | 114 | 95 | 87 | 155 | 135 | 185 | 135 | 145 | 180 | 130 | 145 |
| UL 94 rating | V0 | V1 | V0 | V0 | V0 | V1 | V0 | V0 | V1 | V0 | V0 | V1 | V1 | V0 | V0 | V0 | V0 | V0 |
| Wire TS | — | — | 20.5 | 16.7 | 17.5 | 15.8 | 18 | 16.7 | 16.2 | — | 13.5 | 15.5 | 12.6 | 16.5 | 15.8 | 13.5 | 15.8 | 17.3 |
| Wire TE | — | — | 191 | 204 | 188 | 171 | 185 | 184 | 177 | — | 275 | 210 | 310 | 160 | 225 | 250 | 268 | 250 |

TABLE 14-continued

| | 43 | 44 | 45 | 46 | 47 | 48 | 49 | 50 | 51 | 52 | 53 | 54 | 55 | 56 | 57* | 58* | 59* | 60* |
|---|---|---|---|---|---|---|---|---|---|---|---|---|---|---|---|---|---|---|
| Heat deformation, % | 49 | | 36 | 38 | 30 | 21 | 29 | 28 | 17 | | 35 | | | | | 81 | 71 | 76 |
| VW1 | Pass | Pass | Pass | Pass | Pass | Pass | Pass | Pass | Pass | Pass | Pass | Pass | Pass | Pass | Pass | Pass | Pass | Pass |
| Migration to PS | SM | — | NV | NV | NV | NV | NV | NV | NV | NV | NV | NV | NV | NV | M | M | M | M |
| Migration to ABS | — | — | SM | SM | SM | SM | SM | SM | NV | NV | SM | NV | — | NV | M | M | M | M |

*Comparative Example;
SM = slight mark;
NV = no visible mark;
M = Obviously visible mark As can be seen from the foregoing examples compositions having an amount of organic phosphate greater than the amount of phosphoric acid salt (Examples 57-60) show good flame retardance but also demonstrate migration against polystyrene and migration against ABS. In contrast examples having an amount of phosphoric acid salt greater than or equal to organic phosphate demonstrate little or no migration.

While the invention has been described with reference to various embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents are incorporated by reference herein.

The invention claimed is:

1. A flame retardant thermoplastic composition comprising:
    a poly(arylene ether);
    an impact modifier;
    a liquid polyolefin;
    a phosphoric acid salt selected from the group consisting of melamine phosphate, melamine pyrophosphate, melamine orthophosphate, diammonium phosphate, monoammonium phosphate, phosphoric acid amide, melamine polyphosphate, ammonium polyphosphate, polyphosphoric acid amide, and combinations of two or more of the foregoing;
    a metal hydroxide; and
    an organic phosphate wherein the amount of phosphoric acid salt by weight is greater than or equal to the amount of organic phosphate by weight.

2. The composition of claim 1 wherein the phosphoric acid salt is present in an amount of 30 to 60 weight percent, the metal hydroxide is present in an amount of 10 to 45 weight percent and the organic phosphate is present in an amount of 9 to 45 weight percent, all based on the combined weight of the phosphoric acid salt, metal hydroxide and organic phosphate.

3. The composition of claim 1, wherein the organic phosphate is selected from the group consisting of tris(butyl phenyl)phosphate, resorcinol bis-diphenylphosphate, bis-phenol A bis-diphenylphosphate, triphenyl phosphate, tris(isopropyl phenyl)phosphate, and combinations of two or more of the foregoing; the phosphoric acid salt is selected from the group consisting of melamine polyphosphate, melamine pyrophosphate and a combination of melamine polyphosphate and melamine pyrophosphate; and the metal hydroxide is selected from the group consisting of magnesium hydroxide, aluminum hydroxide, cobalt hydroxide and combinations of two or more of the foregoing.

4. The composition of claim 1 wherein the impact modifier comprises a combination of a first block copolymer having a polystyrene content of 10 weight percent to 20 weight percent based on the total weight of the first block copolymer and a second block copolymer having a styrene content of 25 weight percent to 50 weight percent based on the total weight of the second block copolymer.

5. The composition of claim 1 wherein the impact modifier comprises a block copolymer comprising an aryl alkylene block and a controlled distribution copolymer block.

6. The composition of claim 1, wherein the weight ratio of metal hydroxide to phosphoric acid salt is 0.3 to 0.8.

7. The composition of claim 1, wherein the composition has a Shore A hardness greater than or equal to 60 when determined by ASTM D2240 using a specimen having a 3 millimeter thickness.

8. A flame retardant thermoplastic composition comprising:
    a poly(arylene ether);
    an impact modifier;
    a liquid polyolefin;
    7 to 20 weight percent of a phosphoric acid salt selected from the group consisting of melamine phosphate, melamine pyrophosphate, melamine orthophosphate, diammonium phosphate, monoammonium phosphate, phosphoric acid amide, melamine polyphosphate, ammonium polyphosphate, polyphosphoric acid amide, and combinations of two or more of the foregoing;
    4 to 15 weight percent of a metal hydroxide; and
    3 to 11 weight percent of an organic phosphate wherein weight percent is with respect to the combined weight of the poly(arylene ether), impact modifier, polyolefin, phosphoric acid salt, metal hydroxide and organic phosphate and
    the amount of phosphoric acid salt by weight is greater than or equal to the amount of organic phosphate by weight.

9. An electrical wire comprising:
    a conductor, and
    a covering disposed over the conductor wherein the covering comprises:
    a flame retardant thermoplastic composition comprises:
    a poly(arylene ether);
    an impact modifier;
    a liquid polyolefin;
    a phosphoric acid salt selected from the group consisting of melamine phosphate, melamine pyrophosphate, melamine orthophosphate, diammonium phosphate, monoammonium phosphate, phosphoric acid amide, melamine polyphosphate, ammonium polyphosphate, polyphosphoric acid amide, and combinations of two or more of the foregoing;

a metal hydroxide; and an organic phosphate wherein the amount of phosphoric acid salt by weight is greater than or equal to the amount of organic phosphate by weight.

10. An electrical wire comprising:

a conductor, and a covering disposed over the conductor wherein the covering comprises:

a flame retardant thermoplastic composition comprises:

a poly(arylene ether);

an impact modifier;

a liquid polyolefin;

7 to 25 weight percent of a phosphoric acid salt selected from the group consisting of melamine phosphate, melamine pyrophosphate, melamine orthophosphate, diammonium phosphate, monoammonium phosphate, phosphoric acid amide, melamine polyphosphate, ammonium polyphosphate, polyphosphoric acid amide, and combinations of two or more of the foregoing;

4 to 15 weight percent of a metal hydroxide; and 3 to 11 weight percent of an organic phosphate wherein weight percent is with respect to the combined weight of the poly(arylene ether), impact modifier, polyolefin, phosphoric acid salt, metal hydroxide and organic phosphate.

11. The composition of claim 1, wherein the metal hydroxide has an average particle size less than or equal to 10 micrometers.

12. The composition of claim 1, wherein the metal hydroxide has a purity greater than or equal to 90 weight percent.

13. The composition of claim 1, wherein the metal hydroxide contains substantially no water.

14. The composition of claim 1, wherein the metal hydroxide is magnesium hydroxide.

15. The composition of claim 1, wherein the composition has a Shore D hardness of 20 to 60 as determined by ASTM D2240 measured on a specimen having a thickness of 3 millimeters.

16. The composition of claim 1, wherein the composition has a flexural modulus, of less than or equal to 1172 megapascals as determined by ASTM D7890 using bars with a thickness of 6.4 millimeters.

17. The composition of claim 1, wherein the poly(arylene ether) is present in an amount of 17 to 40 weight percent, the impact modifier is present in an amount of 15 to 46 weight percent, and the liquid polyolefin is present in an amount of 5 to 25 weight percent, based on the total weight of the composition.

18. The composition of claim 8, wherein the poly(arylene ether) is present in an amount of 17 to 40 weight percent, the impact modifier is present in an amount of 15 to 46 weight percent, and the liquid polyolefin is present in an amount of 5 to 25 weight percent, based on the total weight of the composition.

19. The composition of claim 8, wherein the metal hydroxide is magnesium hydroxide.

20. The composition of claim 8, wherein the impact modifier comprises a combination of a first block copolymer having a polystyrene content of 10 weight percent to 20 weight percent based on the total weight of the first block copolymer and a second block copolymer having a styrene content of 25 weight percent to 50 weight percent based on the total weight of the second block copolymer.

21. The composition of claim 8, wherein the impact modifier comprises a block copolymer comprising an aryl alkylene block and a controlled distribution copolymer block.

22. The composition of claim 8, wherein the weight ratio of metal hydroxide to phosphoric acid salt is 0.3 to 0.8.

23. The wire of claim 9, wherein the conductor is a copper wire.

24. The wire of claim 9, wherein the thermoplastic composition has a tensile strength greater than or equal to 7.0 megapascals and a tensile elongation greater than or equal to 100% as determined by ASTM D638 on Type I specimens having a thickness of 3.2 millimeters.

25. The wire of claim 10, wherein the conductor is a copper wire, the metal hydroxide is magnesium hydroxide, the organic phosphate is selected from the group consisting of tris(butyl phenyl)phosphate, resorcinol bis-diphenylphosphate, bis-phenol A bis-diphenylphosphate, triphenyl phosphate, tris(isopropyl phenyl)phosphate, and combinations of two or more of the foregoing, and the poly(arylene ether) is present in an amount of 17 to 40 weight percent, the impact modifier is present in an amount of 15 to 46 weight percent, and the liquid polyolefin is present in an amount of 5 to 25 weight percent, based on the total weight of the composition.

26. The wire of claim 10, wherein the impact modifier comprises a combination of a first block copolymer having a polystyrene content of 10 weight percent to 20 weight percent based on the total weight of the first block copolymer and a second block copolymer having a styrene content of 25 weight percent to 50 weight percent based on the total weight of the second block copolymer.

* * * * *

UNITED STATES PATENT AND TRADEMARK OFFICE
CERTIFICATE OF CORRECTION

PATENT NO. : 7,582,692 B2 Page 1 of 1
APPLICATION NO. : 11/291467
DATED : September 1, 2009
INVENTOR(S) : Kosaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 471 days.

Signed and Sealed this

Fourteenth Day of September, 2010

David J. Kappos
*Director of the United States Patent and Trademark Office*